(12) United States Patent
Ohno et al.

(10) Patent No.: US 11,370,329 B2
(45) Date of Patent: Jun. 28, 2022

(54) CONTROL APPARATUS OF VEHICLE SEAT

(71) Applicant: Toyota Jidosha Kabushiki Kaisha, Toyota (JP)

(72) Inventors: Mitsuyoshi Ohno, Miyoshi (JP); Hiromu Sakaue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/793,363

(22) Filed: Feb. 18, 2020

(65) Prior Publication Data

US 2020/0269726 A1 Aug. 27, 2020

(30) Foreign Application Priority Data

Feb. 27, 2019 (JP) .............................. JP2019-035006
Oct. 9, 2019 (JP) .............................. JP2019-186414

(51) Int. Cl.
*B60N 2/02* (2006.01)
*B60N 2/90* (2018.01)
(Continued)

(52) U.S. Cl.
CPC ............. *B60N 2/0244* (2013.01); *B60N 2/20* (2013.01); *B60N 2/90* (2018.02); *B60W 10/18* (2013.01);
(Continued)

(58) Field of Classification Search
CPC .......... B60N 2/0244; B60N 2/06; B60N 2/20; B60N 2/22; B60N 2/90; B60N 2002/0268; B60N 2002/981; B60W 10/18; B60W 10/30; B60W 2510/18; B60W 2520/10; B60W 2540/223; B60W 2552/05; B60W 2554/4042; B60W 2556/45;
(Continued)

(56) References Cited

U.S. PATENT DOCUMENTS 9,376,078 B1* 6/2016 Li ........................ B60N 2/2227
2005/0071053 A1* 3/2005 Yamada ............. B60N 2/42727
701/1

(Continued)

FOREIGN PATENT DOCUMENTS

JP 2017-132383 A 8/2017
JP 2017-136898 A 8/2017
(Continued)

*Primary Examiner* — Babar Sarwar
(74) *Attorney, Agent, or Firm* — Dinsmore & Shohl LLP

(57) ABSTRACT

A control apparatus of a vehicle seat includes: at least one actuator configured to adjust at least one of a reclining angle or a position of the vehicle seat in a seat front-rear direction; and a control unit configured to determine whether a road divider is provided on a road where the vehicle is traveling and perform, when determining that no road divider is provided, at least any one of controlling the actuator not to incline the seat back rearward at an angle more than a predetermined angle, controlling the actuator not to position the vehicle seat at a position more rearward than a predetermined position, outputting a warning signal when the seat hack is inclined rearward at an angle more than the predetermined angle, and outputting a warning signal when the vehicle seat is positioned at a position more rearward than the predetermined position.

21 Claims, 20 Drawing Sheets

(51) Int. Cl.
  *B60W 60/00* (2020.01)
  *B60N 2/20* (2006.01)
  *B60W 10/18* (2012.01)
  *B60W 10/30* (2006.01)
  *B60W 50/14* (2020.01)
  *G05D 1/00* (2006.01)

(52) U.S. Cl.
  CPC ............ *B60W 10/30* (2013.01); *B60W 50/14* (2013.01); *B60W 60/0051* (2020.02); *G05D 1/0088* (2013.01); *B60N 2002/0268* (2013.01); *B60N 2002/981* (2018.02); *B60W 2510/18* (2013.01); *B60W 2520/10* (2013.01); *B60W 2540/223* (2020.02); *B60W 2552/05* (2020.02); *B60W 2554/4042* (2020.02); *B60W 2556/45* (2020.02); *B60W 2710/30* (2013.01); *B60W 2720/10* (2013.01)

(58) Field of Classification Search
  CPC ......... B60W 2710/30; B60W 2720/10; B60W 50/14; B60W 60/0051; G05D 1/0088
  See application file for complete search history.

(56) References Cited

U.S. PATENT DOCUMENTS

| | | | |
|---|---|---|---|
| 2007/0080657 A1* | 4/2007 | Gerding | B60N 2/0276 318/466 |
| 2007/0185635 A1* | 8/2007 | Mattes | B60N 2/42727 701/45 |
| 2007/0252404 A1* | 11/2007 | Muck | B60N 2/22 296/65.16 |
| 2008/0296876 A1* | 12/2008 | Ideue | B60R 21/232 280/730.2 |
| 2016/0159251 A1* | 6/2016 | Ebina | B60N 2/0248 701/49 |
| 2017/0217335 A1* | 8/2017 | Tominaga | B60N 2/0248 |
| 2019/0299814 A1* | 10/2019 | Yetukuri | B60N 2/002 |
| 2020/0156518 A1* | 5/2020 | Svitak | B60N 2/501 |
| 2020/0282942 A1* | 9/2020 | Yoshimura | B60N 2/22 |

FOREIGN PATENT DOCUMENTS

| | | |
|---|---|---|
| JP | 2017-170942 A | 9/2017 |
| JP | 2018-167629 A | 11/2018 |
| WO | 2015-011866 A1 | 1/2015 |

\* cited by examiner

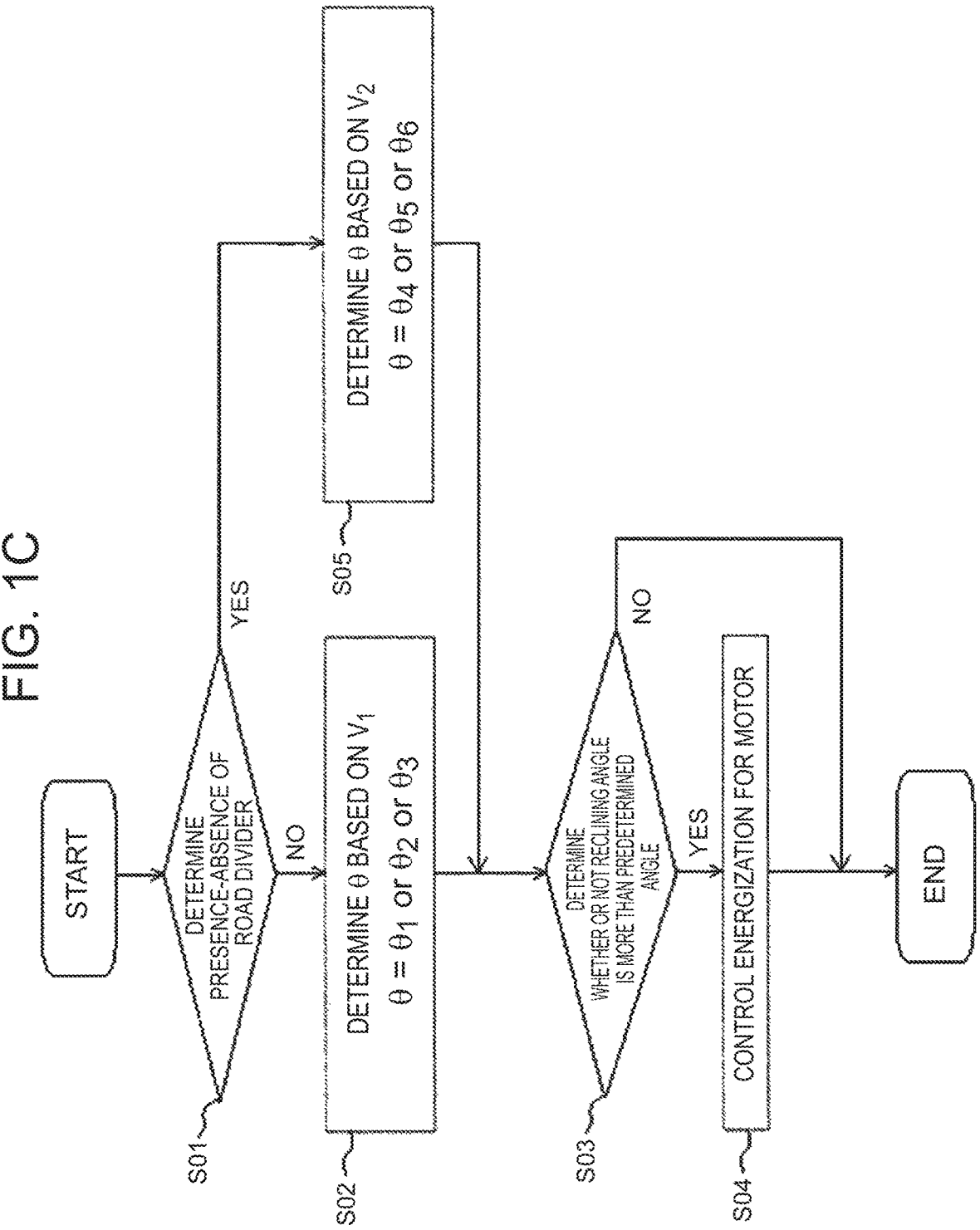

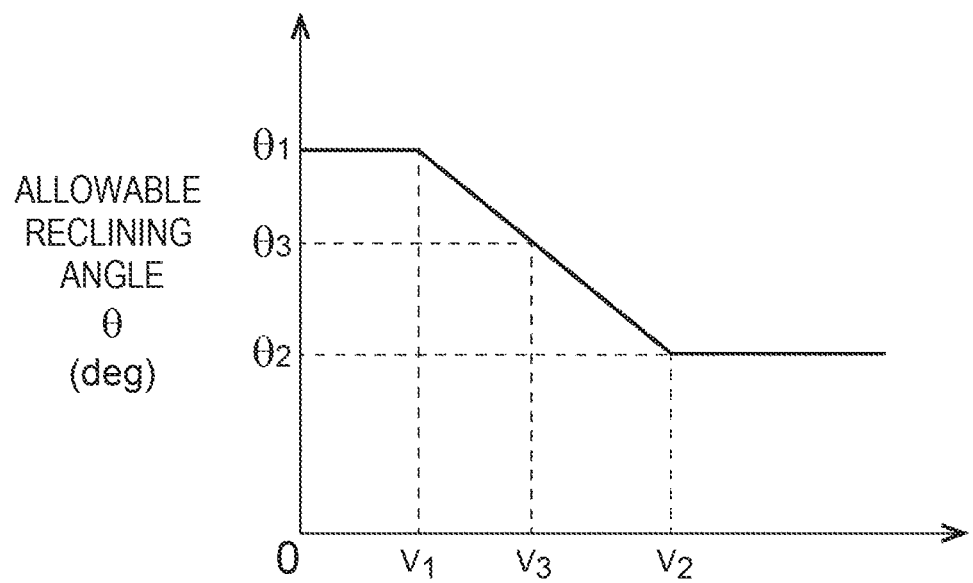

CONTROL APPARATUS OF VEHICLE SEAT

CROSS-REFERENCE TO RELATED APPLICATIONS

This application claims priority to Japanese Patent Application No. 2019-035006 filed on Feb. 27, 2019 and Japanese Patent Application No. 2019-186414 filed on Oct. 9, 2019, each incorporated herein by reference in its entirety.

BACKGROUND

1. Technical Field

The present disclosure relates to a control apparatus of a vehicle seat.

2. Description of Related Art

The following International Publication No. WO 2015/011866 discloses a vehicle driving assistance apparatus that controls a reclining angle of a seat back of a vehicle seat according to a driving mode of a vehicle. In the vehicle driving assistance apparatus described in the above document, control on the motor is performed so as to incline the seat back such that a reclining angle of the seat back in the automatic driving mode is larger than a reclining angle of the seat back in the manual driving mode.

SUMMARY

Meanwhile, in the case in which the reclining angle of the seat back is set to be large in the automatic driving mode or in the case in which the position of the vehicle in the seat front-rear direction is shifted rearward, there is a room for improving a safety of the occupant.

In light of the above circumstances, an object of the present disclosure is to provide a vehicle seat control apparatus having a high safety for an occupant seated in a vehicle seat at the time of a collision of the vehicle in the automatic driving mode.

A vehicle seat control apparatus according to an aspect of the present disclosure includes: at least one actuator provided in a vehicle configured to travel by automatic driving, the actuator being configured to adjust at least one of a reclining angle or a position of the vehicle seat in a seat front-rear direction, and the reclining angle being an angle of a seat back of the vehicle seat in a seat rearward direction relative to a seat cushion of the vehicle seat; and a control unit configured to determine whether or not a road divider is provided on a road where the vehicle is traveling and perform, when determining that no road divider is provided, at least any one of 1) controlling the actuator not to incline the seat back rearward at an angle more than a predetermined angle, 2) controlling the actuator not to position the vehicle seat at a position more rearward than a predetermined position, 3) outputting a warning signal when the seat back is inclined rearward at an angle more than the predetermined angle, and 4) outputting a warning signal when the vehicle seat is positioned at a position more rearward than the predetermined position.

According to the above aspect, by operating one or a plurality of actuators, at least one of the reclining angle of the seat back and the position of the vehicle seat in the seat front-rear direction is adjusted. Here, when no road divider is provided on the road on which the vehicle (hereinafter referred to as an "own vehicle") including the vehicle seat control apparatus of the present disclosure is traveling, it can be considered that the own vehicle and a vehicle traveling in the oncoming lane (hereinafter referred to as an "oncoming vehicle") may collide with each other, and thus deceleration acceleration of the own vehicle may become higher. For this reason, the control unit performs any one of the above (1) to (4) when the control unit determines that no road divider is provided on the road where the own vehicle is traveling. With this configuration it is possible to reduce occurrence of such an event that the seated occupant slips frontward along the seat cushion and impairment of the restraining performance of the upper body of the seated occupant at the time of a collision with the oncoming vehicle, to thereby reduce increase in injury value of the seated occupant.

In the above aspect, the control unit may be configured to, when the control unit determines that the road divider is provided, set at least one of the predetermined angle and the predetermined position based on at least one of a traveling speed of the vehicle and an estimated speed of the vehicle.

According to the above configuration, when a road divider is provided (when there is a low possibility of a collision with a vehicle traveling in the oncoming lane), it is possible to set the degree of the allowable reclining angle and the allowable position in the seat front-rear direction of the vehicle seat, depending on the traveling speed or the estimated speed of the own vehicle.

In the above aspect, the control unit may be configured to, when the control unit determines that no road divider is provided, set at least one of the predetermined angle and the predetermined position based on at least an estimated speed of an oncoming vehicle that is traveling in an oncoming lane of the road where the vehicle is traveling.

According to the above configuration, when no road divider is provided (when there is a possibility of a collision with the vehicle traveling in the oncoming lane), taking into consideration the speed of the oncoming vehicle traveling in the oncoming lane, the degree of the allowable reclining angle and the allowable position in the front-rear direction of the vehicle seat can be set.

In the above aspect, the control unit may be configured to, when the control unit determines that no mad divider is provided, set at least one of the predetermined angle and the predetermined position, based on a summed speed of a traveling speed of the vehicle and the estimated speed of the oncoming vehicle or a summed speed of the estimated speed of the vehicle and the estimated speed of the oncoming vehicle.

According to the above configuration, when no road divider is provided (when there is a possibility of a collision with the vehicle traveling in the oncoming lane), it is possible to set the degree of the allowable reclining angle and the allowable position in the seat front-rear direction of the vehicle seat, while assuming that the collision speed with the oncoming vehicle traveling in the oncoming lane.

In the above aspect, the control unit may be configured to: acquire information on the road where the vehicle is traveling by wireless communication; and determine the estimated speed of the oncoming vehicle based on the information on the road acquired by the wireless communication.

According to the above configuration, based on the information on the road acquired by the wireless communication, it is possible to set the degree of the allowable reclining angle and the allowable position in the seat front-rear direction of the vehicle seat.

In the above aspect, the control unit may be configured to: acquire information from the oncoming vehicle by the wireless communication; and determine the estimated speed of the oncoming vehicle based on the information acquired by the wireless communication.

According to the above configuration, based on the information from the oncoming vehicle traveling in the oncoming lane acquired by the wireless communication, it is possible to set the degree of the allowable reclining angle and the allowable position in the front-rear direction of the vehicle seat.

In the above aspect, the control unit may be configured to acquire speed information of the oncoming vehicle by a sensor provided in the vehicle, and the control unit may determine the estimated speed of the oncoming vehicle based on the speed information of the oncoming vehicle acquired from the sensor.

According to the above configuration, based on the speed information of the oncoming vehicle traveling in the oncoming lane obtained by the sensor, it is possible to set the degree of the allowable reclining angle and the allowable position in the seat front-rear direction of the vehicle seat.

In the above aspect, the control unit may be configured to acquire information on a lane where at least one of the vehicle and the oncoming vehicle is traveling by a sensor provided in the vehicle, and the control unit may determine the estimated speed of the oncoming vehicle based on the information on the lane acquired from the sensor.

According to the above configuration, based on the lane information acquired by the sensor, it is possible to set the degree of the allowable reclining angle and the allowable position in the seat front-rear direction of the vehicle seat.

In the above aspect, the control unit may be configured to define a speed obtained by subtracting a deceleration amount by automatic braking from the traveling speed of the vehicle as the estimated speed of the vehicle According to the above configuration, taking into consideration the deceleration amount by the automatic braking, it is possible to set the degree of the allowable reclining angle and the allowable position in the front-rear direction of the vehicle seat.

In the above aspect, the vehicle seat may include the actuator for reclining that adjusts a reclining angle of the seat back in a seat rearward direction; the control unit may be configured to when the control unit determines that no road divider is provided on the road where the vehicle is traveling by the automatic driving, control the actuator for reclining such that the reclining angle becomes smaller than a reclining angle in a case in which the control unit determines that the road divider is provided, or when the control unit determines that no road divider is provided on the road where the vehicle is traveling, output the warning signal at the reclining angle smaller than a reclining angle in a case in which the control unit determines that the road divider is provided.

According to the above configuration, the seat back is inclined in the seat front-rear direction relative to the seat cushion by operating the actuator for reclining. Here, in a state where it is determined that no road divider is provided on the road where the own vehicle is traveling, it can be considered that there is a high possibility that the deceleration acceleration of the own vehicle, in a case where the own vehicle and the vehicle traveling in the oncoming lane collide with each other, is large. For this reason, when the control unit determines that no road divider is provided on the road where the own vehicle is traveling by automatic driving, the control unit controls the actuator for reclining to set the reclining angle to be smaller than in the case in which the road divider is provided, or outputs a warning signal at a reclining angle smaller than in the case in which the control unit determines that the road divider is provided. Accordingly, it is possible to restrain the reclining angle of the seat back from being larger in the seat rearward direction in the case in which no road divider is provided on the road where the own vehicle is traveling. As a result, at the time of a collision with the vehicle traveling in the oncoming lane, such an event that the seated occupant slides frontward along the seat cushion and the restraint performance of the upper body of the seated occupant are suppressed from being impaired, to thus reduce increase in injury value of the seated occupant.

In the above aspect, the control unit may be configured to set the predetermined angle based on a position in the seat front-rear direction of the seat cushion.

According to the above configuration, the control unit controls the actuator for reclining or outputs the warning signal based on the position in the seat front-rear direction of the seat cushion. Thereby, the degree of the allowable reclining angle can be set based on the position in the seat front-rear direction of the seat cushion.

In the above aspect, the control unit may be configured to set the predetermined angle based on a position of knees of an occupant seated in the seat cushion.

According to the above configuration, the control unit controls the actuator for reclining or outputs the warning signal based on the position of the knees of the occupant seated in the seat cushion. Accordingly, the degree of the allowable reclining angle can be set depending on the position of the knees of the occupant seated in the seat cushion.

In the above aspect, the control unit may be configured to set the predetermined angle based on a position of a head of an occupant seated in the seat cushion.

According to the above configuration, based on the position of the head of the occupant seated in the seat cushion, the control unit controls the actuator for reclining or outputs the warning signal. Thereby, the degree of the allowable reclining angle can be set depending on the position of the head of the occupant seated in the seat cushion.

In the above aspect, the control unit may be configured to stop an inclination of the seat back by stopping an operation of the actuator for reclining when the reclining angle reaches the predetermined angle.

According to the above configuration, when the reclining angle reaches the allowable reclining angle, the control unit stops the operation of the actuator for reclining. Thereby, the inclination of the seat back is stopped, to thereby prevent or restrain the reclining angle of the seat back in the seat rearward direction from becoming larger than the allowable reclining angle.

In the above aspect, the control unit may be configured to cause the seat back to incline frontward, by operating the actuator for reclining, so as to set the reclining angle to an angle equal to or smaller than the predetermined angle.

According to the above configuration, the seat back is inclined such that the reclining angle reaches an angle corresponding to the allowable reclining angle. Thereby, the reclining angle of the seat back in the seat rearward direction is prevented and restrained from becoming larger than the allowable reclining angle.

In the above aspect, the vehicle seat may include the actuator for seat sliding that adjusts the position of the vehicle seat in the seat front-rear direction, and the control unit may be configured to when the control unit determines that no road divider is provided on the road where the vehicle is traveling by automatic driving, control the actuator for seat sliding so as to position the vehicle seat more frontward than in a case in which the control unit determines that the road divider is provided, or when the control unit determines that no road divider is provided on the road where the vehicle is traveling, output a warning signal in a state in which the vehicle seat is positioned more frontward than in the case in which the control unit determines that the road divider is provided.

According to the above configuration, the vehicle seat is moved in the seat front-rear direction by operating the actuator for seat sliding. Here, in the case in which no road divider is provided on the road where the own vehicle is traveling, it can be considered that there is a high possibility that deceleration acceleration of the own vehicle, when the own vehicle and the vehicle traveling in the oncoming lane collide with each other, is high. Therefore, when the control unit determines that no road divider is provided on the road where the own vehicle is traveling by automatic driving, the control unit controls the actuator for seat sliding to position the vehicle seat more frontward than in the case in which the road divider is provided, or outputs the warning signal in the state in which the vehicle seat is positioned more frontward than in the case in which the control unit determines that the road divider is provided. Accordingly, a distance in the seat front-rear direction between the occupant seated in the vehicle seat and a member configuring the vehicle in the case in which no road divider is provided on the road where the own vehicle is traveling is restrained from becoming longer. As a result, at the time of a collision with the vehicle traveling in the oncoming lane, occurrence of such an event that the seated occupant slides along the seat cushion in the seat frontward direction is suppressed, to thereby reduce increase in injury value of the seated occupant.

In the above aspect, the vehicle seat may be configured to stop movement in the seat front-rear direction of the vehicle seat by the control unit stopping operation of the actuator for seat sliding when the position of the vehicle seat in the seat front-rear direction reaches the predetermined position.

According to the above configuration, when the position of the vehicle seat in the seat front-rear direction reaches an allowable position, the control unit stops the operation of the actuator for seat sliding. Thereby, the movement of the vehicle seat in the seat front-rear direction is stopped, and thus it is prevented or suppressed that the position of the vehicle seat in the seat front-rear direction is positioned more rearward than the allowable position.

In the above aspect, the vehicle seat may be configured to move frontward by the control unit operating the actuator for seat sliding such that the position of the vehicle seat is positioned at the predetermined position or at a position more frontward than the predetermined position in the seat front-rear direction.

According to the above configuration, the vehicle seat is moved such that the position of the vehicle seat in the seat front-rear direction reaches the allowable position. Accordingly, the position of the vehicle seat in the seat front-rear direction is prevented or suppressed from being positioned more rearward than the allowable position.

In the above aspect, the control unit may be configured to decelerate the vehicle at least either when the seat back is inclined rearward at an angle more than a predetermined angle or when the vehicle seat is positioned more rearward than the predetermined position.

According to the above configuration, the collision speed between the own vehicle and the oncoming vehicle can be lower. Thereby, it is possible to reduce increase in injury value of the seated occupant at the time of a collision between the own vehicle and the oncoming vehicle.

In the above aspect, the control unit may be configured to acquire information on the road where the vehicle is traveling by wireless communication, and a control unit may perform at least one of the control on the actuator and an output of the warning signal, assuming that no road divider is provided when the control unit determines that the road is a road for two-way traffic based on the information on the road acquired by the wireless communication.

According to the above configuration, taking into consideration a case in which two-way traffic is in effect due to restrictions on the road, or the like, for example, it is possible to set the degree of the allowable reclining angle, etc., and provide a warning.

In the above aspect, the vehicle may be configured to travel by manual driving or the automatic driving; the seat back may be configured to be inclined rearward by the control unit operating the actuator when driving of the vehicle is switched from the manual driving to the automatic driving; and the vehicle seat may be configured to be moved rearward by the control unit operating the actuator when the driving of the vehicle is switched from the manual driving to the automatic driving, or be moved rearward with the seat back being inclined rearward by the control unit operating the actuator when the driving of the vehicle is switched from the manual driving to the automatic driving.

According to the above configuration, when the driving of the vehicle is switched from the manual driving to the automatic driving, the seated occupant can change the posture and the position of the vehicle seat that allows the seated occupant to take a comfortable posture.

The vehicle seat control apparatus according to the present disclosure has an effect to improve a safety for an occupant seated in the vehicle seat at the time of a collision of the vehicle in the automatic driving mode.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1C is a flowchart showing a flow of processing by the vehicle seat control apparatus;

FIG. 21 is a graph showing a relationship between an own vehicle setting speed and the like and an allowable reclining angle in the state in which no road divider is provided in the tenth embodiment.

DETAILED DESCRIPTION OF EMBODIMENTS

Vehicle Seat Control Apparatus 10 According to First Embodiment

A vehicle seat control apparatus 10 according to the first embodiment of the present disclosure will be described with reference to FIG. 1A to FIG. 3. Note that, as shown appropriately in each drawing, an arrow FR indicates a front side in the front-rear direction of a vehicle 12, and an arrow UP indicates an upper side in the height direction of the vehicle 12. Further, the front side and the upper side of the vehicle 12 coincide with the front side and the upper side of the vehicle seat 14, respectively. In the following description, when simply using the front-rear, left-right, and height directions, unless otherwise specified, these directions respectively denote the front and rear in the front-rear direction of the vehicle 12 and the vehicle seat 14, the left and right in the left-right direction (vehicle width direction) of the vehicle 12 and the vehicle seat 14, and the up and down in the height direction of the vehicle 12 and the vehicle seat 14.

Figure 1A:
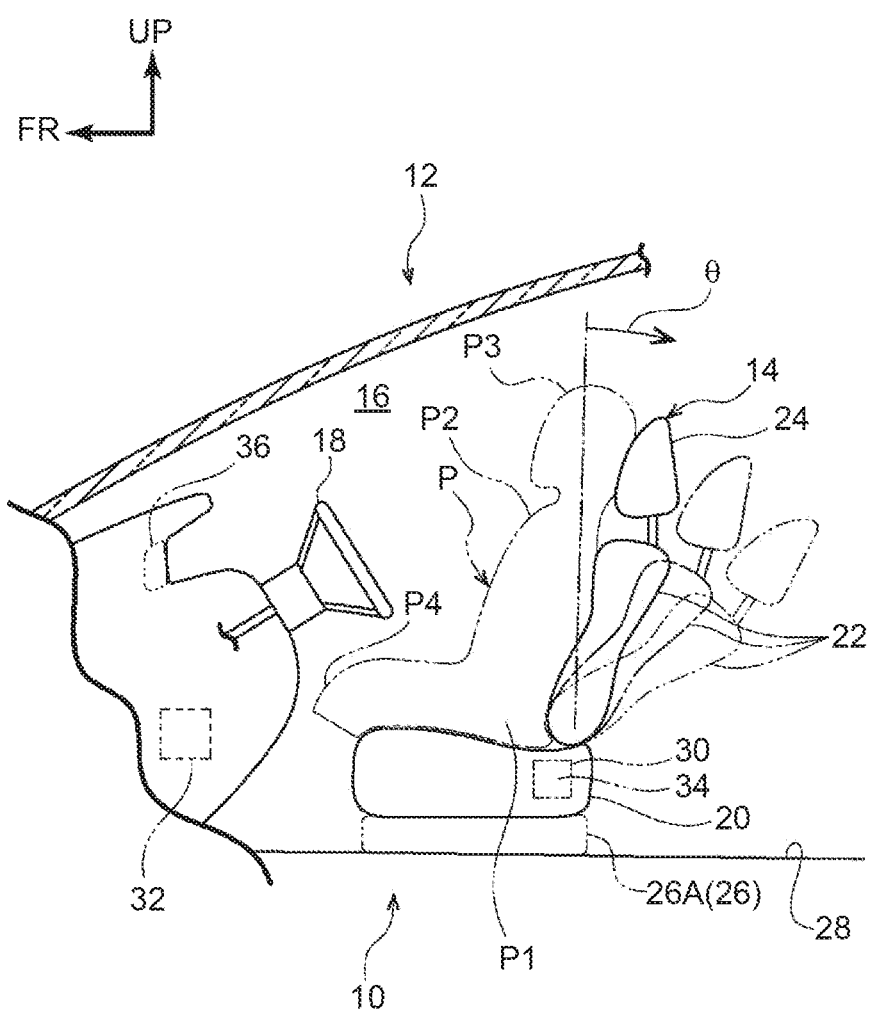
FIG. 1A is a side view showing a cabin of a vehicle including a vehicle seat control apparatus according to a first embodiment.

FIG. 1A shows a cabin 16 of the vehicle 12 including the vehicle seat control apparatus 10 of the present embodiment. As shown in the drawing, the cabin 16 is provided with the vehicle seat 14 in which an occupant P handling a steering wheel 18 and others is seated. The vehicle seat 14 includes a seat cushion 20 that supports buttocks P1 of the occupant P, and a seat back 22 that supports an upper body P2 of the occupant P. The vehicle seat 14 includes a headrest 24 that supports a head P3 of the occupant P.

The seat cushion 20 is configured by mounting a seat cushion pad covered with a skin material to a seat cushion frame or the like. The seat cushion 20 is supported on a floor 28 of the cabin 16 via a seat rail 26 (an upper rail 26A and a not-shown lower rail) that allows the seat cushion 20 to slide in the front-rear direction.

Here, the vehicle seat 14 of the present embodiment is provided in the cabin 16 of the vehicle 12 capable of performing automatic driving and manual driving. Therefore, the vehicle seat 14 is movable in the front-rear direction from a position where the occupant P seated in the vehicle seat 14 can handle the steering wheel 18 and others to a position where the occupant P cannot handle this. FIG. 1A shows a state in which the vehicle seat 14 is moved frontward to the position where the occupant P seated in the vehicle seat 14 can handle the steering wheel 18 and others.

As with the seat cushion 20, the seat back 22 is configured by mounting a seat back pad covered with a skin material to the seat back frame or the like. The seat back 22 is mounted to a rear end of the seat cushion 20 so as to recline (tilt) in the seat front-rear direction. Further, in the present embodiment, the seat back 22 is configured to tilt by operating a motor 30 for reclining as an actuator.

The headrest 24 is configured by mounting a headrest body including a headrest pad covered with a skin material to a headrest stay. As the headrest stay is inserted into a not-shown insertion portion provided in the seat back 22, the headrest 24 is mounted to an upper end of the seat back 22.

Figure 1B:
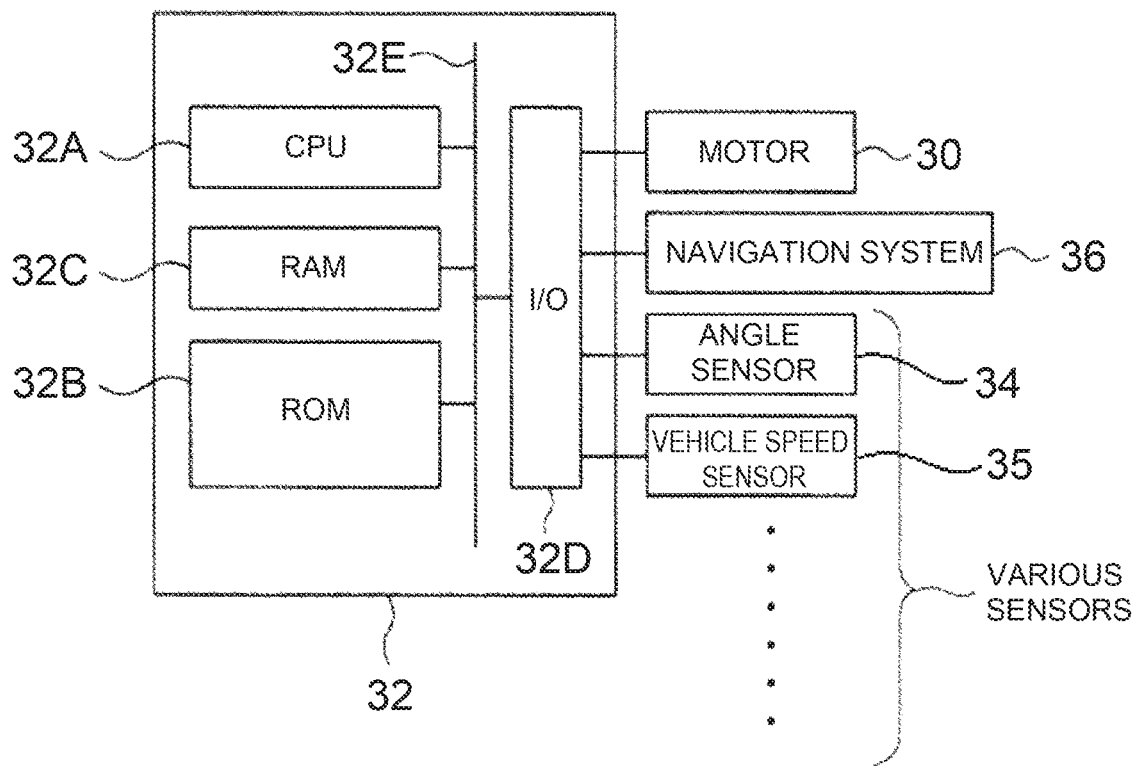
FIG. 1B is a block diagram showing a control system of the vehicle seat control apparatus.

As shown in FIG. 1A and FIG. 1B, the vehicle seat control apparatus 10 includes: the motor 30 that inclines the seat back 22; and an ECU 32 serving as a control unit that controls the motor 30.

The motor 30 is a DC motor that rotates as energization for the motor 30 is controlled by the ECU 32. The motor 30 is provided with an angle sensor 34 for calculating a reclining angle θ of the seat back 22 in the seat rearward direction based on the number of rotations (rotation angle) of a rotation shaft of the motor 30.

The ECU 32 is configured to include a CPU (central processing unit) 32A, a ROM (read only memory) 32B, a RAM (random access memory) 32C, and an input-output interface unit (I/O) 32D that provides communication with an external device, and these components are mutually connected with one another via a bus 32E. The motor 30 and various sensors provided in the vehicle 12, such as a navigation system 36, the angle sensor 34, and a vehicle speed sensor 35 that detects a speed of the vehicle 12, are electrically connected to the input-output interface unit 32D.

The CPU 32A is a central processing unit, and executes various programs and controls the motor 30 and others. That is, the CPU 32A reads a control program from the ROM 32B, and executes this control program while using the RAM 32C as a working area so as to control the motor 30.

Then, the ECU 32 determines whether or not a road divider is provided on the road where the vehicle 12 is traveling based on the information from the navigation system 36 during the automatic driving of the vehicle 12, and controls energization for the motor 30. Here, a road divider divides the road into a lane where the vehicle 12 (own vehicle) is traveling and a lane where an oncoming vehicle is traveling. For example, the road divider may be a shelf, a curb, a wall, a fence, or a ditch. Furthermore, this road divider may be referred to as a medial divider.

Further, when deceleration acceleration of the vehicle 12 is assumed to increase at the time of a frontal collision of the vehicle 12, the ECU 32 controls the motor 30 so as to set the reclining angle θ to be small.

When No Road Divider is Provided

More specifically, as shown in FIG. 1A, FIG. 1B, and FIG. 1C, when the ECU 32 determines that no road divider is provided on the road where the vehicle 12 is traveling, that is, when an affirmative determination is made in step S01 in FIG. 1C, the ECU 32 determines, in step S02, an allowable reclining angle θ based on a speed $V_1$ obtained by adding together a speed of the vehicle 12 (own vehicle speed) and a road limit speed (an oncoming lane limit speed defined as an estimated speed of an oncoming vehicle) recorded in advance in the navigation system 36. Note that the "speed of the vehicle 12 (own vehicle speed)" is a setting speed or an actual speed of the vehicle 12 during the automatic driving. The actual speed is a speed of the vehicle 12 based on a speed signal, a speed of the vehicle 12 based on a GPS signal, and the like. The setting speed of the vehicle 12 during the automatic driving is set to a limit speed of the road (own lane limit speed) when the road conditions and the weather are fine. Further, the own lane limit speed and the oncoming lane limit speed often have the same limit speed.

Figure 2:
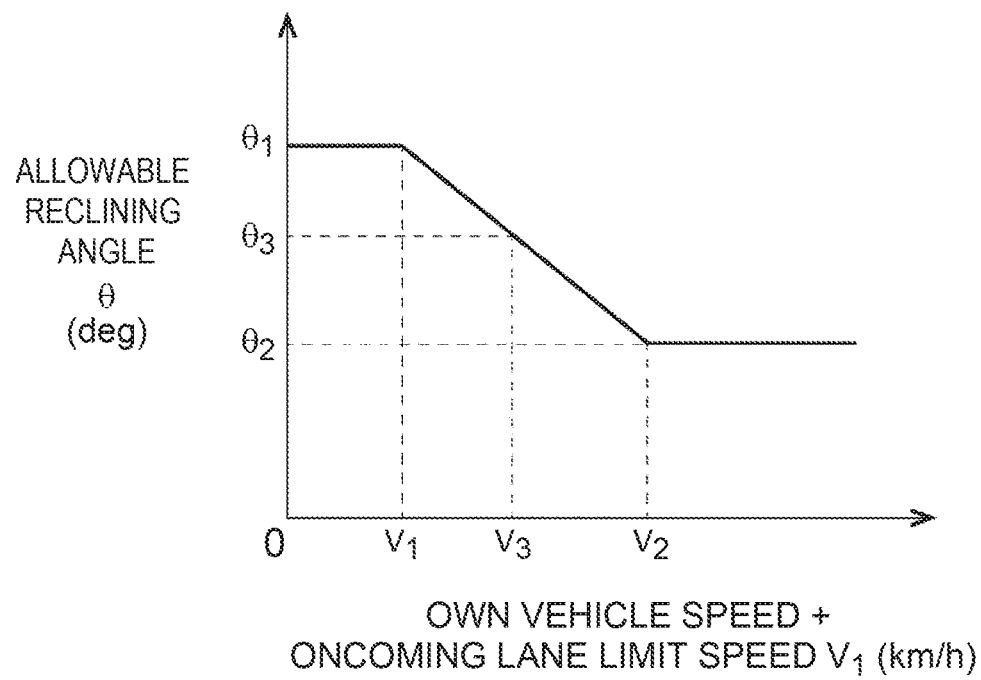
FIG. 2 is a graph showing a relationship between an own vehicle setting speed and the like and an allowable reclining angle in the case in which no road divider is provided.

As shown in FIG. 2, when the speed $V_1$ obtained by adding together the own vehicle speed and the oncoming lane limit speed is 0 km/h or more and $v_1$ km/h or less, the ECU 32 determines the allowable reclining angle θ as $θ_1$. Then, after determining the allowable reclining angle θ as $θ_1$, the ECU 32 determines whether or not the reclining angle θ of the seat back 22 is more than $θ_1$ in step S03. When an affirmative determination is made in step S03, the ECU 32 controls energization for the motor 30 in step S04 so as to set the reclining angle θ of the seat back 22 not to be more than $θ_1$. That is, when the ECU 32 determines the allowable reclining angle θ as $θ_1$, the ECU 32 starts the energization for the motor 30 in the case in which the seat back 22 reclines to an angle more than $θ_1$. Hence, the seat back 22 is inclined until the reclining angle θ becomes equal to or smaller than $θ_1$. When a negative determination is made in step S03, the ECU 32 ends the processing. Or, when the negative determination is made in step S03, the ECU 32 may incline the seat back 22 rearward by the energization for the motor 30 and then stop the energization for the motor 30 when the reclining angle θ of the seat back 22 reaches $θ_1$. As an example, $v_1$ is 30 km/h and $θ_1$ is 60°.

Further, as shown in FIG. 2, when the speed $V_1$ obtained by adding together the own vehicle speed and the oncoming lane limit speed is more than $v_2$ km/h, the ECU 32 determines the allowable reclining angle θ as $θ_2$, and then performs the above-described processing in steps S03 and S04. Then, When the ECU 32 determines the allowable reclining angle θ as $θ_2$, the ECU 32 starts the energization for the motor 30 if the seat back 22 reclines to an angle more than $θ_2$. As a result, the seat back 22 is inclined until the reclining angle θ becomes equal to or smaller than $θ_2$. If the seat back 22 does not recline to an angle more than $θ_2$, the ECU 32 may end the processing. Or, the ECU 32 may incline the seat back 22 rearward by the energization for the motor 30 and then stop the energization for the motor 30 when the reclining angle θ of the seat back 22 reaches $θ_2$ As an example, $v_2$ is 110 km/h and $θ_2$ is 30°.

Further, when the speed $V_1$ obtained by adding together the own vehicle speed and the oncoming lane limit speed is a speed $v_3$ that is more than $v_1$ km/h and less than $v_2$ km/h, the ECU 32 determines the allowable reclining angle θ as an angle $θ_3$ corresponding to the speed $v_3$ obtained by adding together the own vehicle speed and the oncoming lane limit speed, and performs the processing in step S03 and step S04. In the present embodiment, $θ_3$ is calculated through proportional interpolation between $(v_1, θ_1)$ and $(v_2, θ_2)$ as shown in the graph of FIG. 2. Then, When the ECU 32 determines the allowable reclining angle θ as $θ_3$, the ECU 32 starts the energization for the motor 30 if the seat back 22 reclines at an angle more than $θ_3$. Accordingly, the seat back 22 is inclined until the reclining angle θ becomes equal to or smaller than $θ_3$. If the seat back 22 does not recline to an angle more than $θ_3$, the ECU 32 may end the processing. Or, the ECU 32 may incline the seat back 22 rearward by the energization for the motor 30 and then stop the energization for the motor 30 when the reclining angle θ of the seat back 22 reaches $θ_3$.

When Road Divider is Provided

When the ECU 32 determines that a road divider is provided on the road where the vehicle 12 is traveling, that is, when a negative determination is made in step S01, the ECU 32 determines the allowable reclining angle θ based on the vehicle speed $V_2$ (own vehicle speed) of the vehicle 12 in step S05.

Figure 3:
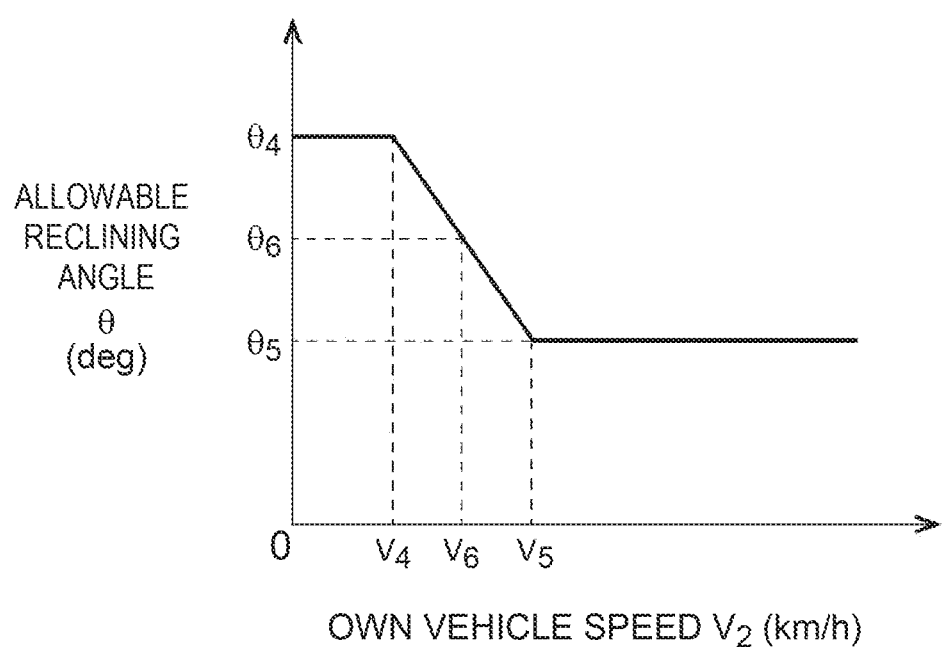
FIG. 3 is a graph showing a relationship between the own vehicle setting speed and the like and the allowable reclining angle when a road divider is provided.

As shown in FIG. 3, when the own vehicle speed $V_2$ is 0 km/h or more and $v_4$ km/h or less, the ECU 32 determines the allowable reclining angle θ as $θ_4$. Then, after determining the allowable reclining angle θ as $θ_4$, the ECU 32 determines whether or not the reclining angle θ of the seat back 22 reclines at an angle more than $θ_4$ in step S03. When an affirmative determination is made in step S03, the ECU 32 controls the energization for the motor 30 in step S04 so as to control the reclining angle θ of the seat back 22 not to be more than $θ_4$. When the ECU 32 determines the allowable reclining angle θ as $θ_4$, the ECU 32 starts the energization for the motor 30 if the seat back 22 reclines at an angle more than $θ_4$. Accordingly, the seat back 22 is inclined until the reclining angle θ becomes $θ_4$ or less. When a negative determination is made in step S03, the ECU 32 ends the processing. Or, when the negative determination is made in step S003, the ECU 32 may incline the seat back 22 rearward by the energization for the motor 30 and then stop the energization for the motor 30 when the reclining angle θ of the seat back 22 reaches $θ_4$ As an example, $v_4$ is 20 km/h and $θ_4$ is 60°.

Further, when the own vehicle speed $V_2$ becomes more than $v_5$ km/h, the ECU 32 determines the allowable reclining angle θ as $θ_5$, and performs the above-described processing in step S03 and step S04. Then, When the ECU 32 determines the allowable reclining angle θ as $θ_5$, the ECU 32 starts the energization for the motor 30 if the seat back 22 reclines at an angle more than $θ_5$. Accordingly, the seat back 22 is inclined until the reclining angle θ becomes equal to $θ_5$ or less. If the seat back 22 does not recline to an angle more than $\theta_5$, the ECU 32 may end the processing. Or, the ECU 32 may incline the seat back 22 rearward by the energization for the motor 30 and then stop the energization for the motor 30 when the reclining angle $\theta$ of the seat back 22 reaches $\theta_5$. As an example, $v_5$ is 50 km/h and $\theta_5$ is 30°.

Further, when the own vehicle speed $V_2$ is a speed $v_6$ more than $v_4$ km/h and less than $v_5$ km/h, the ECU 32 determines the allowable reclining angle $\theta$ as an angle $\theta_6$ corresponding to an own vehicle speed $v_6$, and the above-described processing in the step S03 and step S04 is performed. In the present embodiment, $\theta_6$ is calculated through proportional interpolation between ($v_4$, $\theta_4$) and ($v_5$, $\theta_5$) shown in the graph of FIG. 3. Then, When the ECU 32 determines the allowable reclining angle $\theta$ as $\theta_6$, the ECU 32 starts the energization for the motor 30 if the seat back 22 reclines at an angle more than $\theta_6$. Accordingly, the seat back 22 is inclined until the reclining angle $\theta$ becomes equal to $\theta_6$ or less. If the seat back 22 does not recline to an angle more than $\theta_6$, the ECU 32 may end the processing. Or, the ECU 32 may incline the seat back 22 rearward by the energization for the motor 30 and then stop the energization for the motor 30 when the reclining angle $\theta$ of the seat back 22 reaches $\theta_6$.

As described above, in the present embodiment, a threshold value of the allowable reclining angle $\theta$ is set based on presence or absence of a road divider and the speed $V_1$ obtained by adding together the own vehicle speed and the oncoming lane limit speed or the own vehicle speed $V_2$. That is, when it is assumed that the deceleration acceleration of the vehicle 12 becomes higher when the vehicle 12 has a frontal collision, the ECU 32 controls the motor 30 to set the reclining angle $\theta$ to be smaller. With this configuration, the reclining angle $\theta$ of the seat back 22 is restrained from becoming larger when the road divider is provided on the road where the vehicle is traveling and when a relative speed between the own vehicle and the oncoming vehicle is high. As a result, at the time of a collision with a vehicle traveling in the oncoming lane, an event in which the seated occupant P slides along the seat cushion 20 in the seat frontward direction (a submarine phenomenon), and the restraint performance of the upper body of the seated occupant P (restraint performance by a three-point seat belt or an airbag) are restrained, to thus reduce increase in injury value of the seated occupant P. Here, the injury value of the occupant P indicates a degree of an impact received by the occupant P when a collision with a vehicle traveling in the oncoming lane.

In addition, it may be configured that, after the driving mode is switched from the manual driving to the automatic driving, the occupant P seated in the vehicle seat 14 can take a comfortable posture by inclining the seat back 22 rearwards automatically or through switching operation by the occupant. Even in this configuration, it is possible to reduce increase in injury value of the occupant P by limiting the reclining angle $\theta$ of the seat back 22 as described above.

In the present embodiment, the description has been provided on the example in which the threshold value of the allowable reclining angle $\theta$ is set based on presence or absence of a road divider, the speed $V_1$ obtained by adding together the own vehicle speed and the oncoming lane limit speed, and the own vehicle speed $V_2$; however, the present disclosure is not limited to this example. For example, the threshold value of the allowable reclining angle $\theta$ when no road divider is provided on the road where the vehicle 12 is traveling and the threshold value of the allowable reclining angle $\theta$ when a road divider is provided on the road where the vehicle 12 is traveling may be fixed values. In addition, the threshold value of the allowable reclining angle $\theta$ may be set based on at least one of presence-absence of a road divider, the own vehicle speed, and the limit speed.

In the present embodiment, the description has been provided on the example in which the motor 30 is controlled so as to set the reclining angle $\theta$ of the seat back 22 not to be more than the above-described threshold value, but the present disclosure is not limited to this example. For example, when the reclining angle $\theta$ of the seat back 22 is more than the above-described threshold value, the ECU 32 may output a warning signal to emit a warning sound in the cabin 16. Alternatively, the ECU 32 may output a warning signal to allow a warning lamp to blink in the cabin 16. That is, the ECU 32 may alert the occupant that the high safety is not ensured by outputting a warning signal.

Vehicle Seat Control Apparatus 38 According to Second Embodiment

A vehicle seat control apparatus 38 according to the second embodiment of the present disclosure will be described with reference to FIG. 4 to FIG. 6. Note that in the vehicle seat control apparatus 38 according to the second embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

Meanwhile, depending on the front-rear position of the vehicle seat 14, at the time of a frontal collision of the vehicle 12, the legs of the occupant P seated in the vehicle seat 14 can be restrained by an instrument panel (knee panel) 39, a knee airbag (not shown), or the like in some cases. In this case, the submarine phenomenon hardly occurs. Therefore, as shown in FIG. 4 and FIG. 5, in the vehicle seat control apparatus 38 according to the present embodiment, taking into consideration the front-rear position of the vehicle seat 14 (seat cushion 20), the threshold value of the allowable reclining angle $\theta$ of the seat back 22 is set. The front-rear position of the vehicle seat 14 (seat cushion 20) is detected by a seat position sensor 40, and the seat position sensor 40 is electrically connected to the ECU 32.

When the ECU 32 determines that no road divider is provided on the road where the vehicle 12 is traveling, the ECU 32 determines the allowable reclining angle $\theta$ based on the speed $V_1$ obtained by adding together the speed of the vehicle 12 (own vehicle speed) and the limit speed of the road (oncoming lane limit speed) recorded in advance in the navigation system 36, and the front-rear position of the vehicle seat 14.

Figure 4:
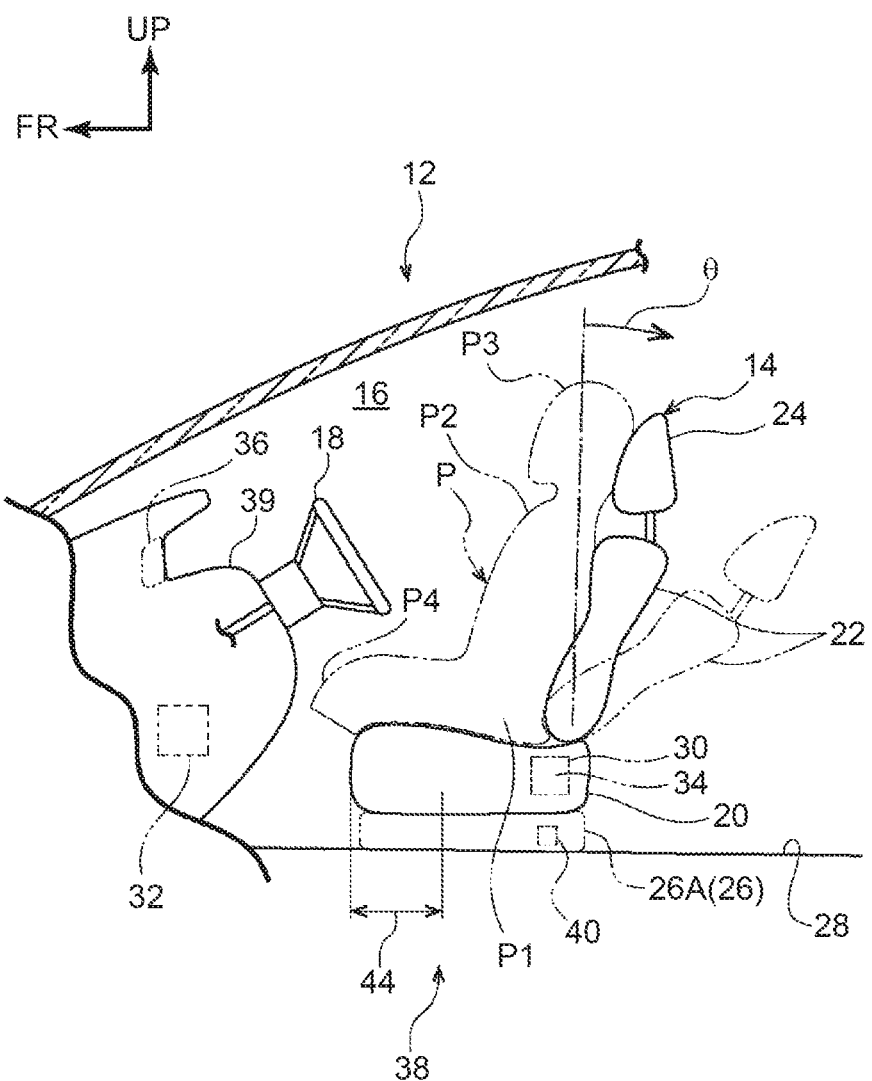
FIG. 4 is a side view showing a vehicle cabin including a vehicle seat control apparatus according to a second embodiment, showing a state in which a position of the vehicle seat is located on the front side.
Figure 5:
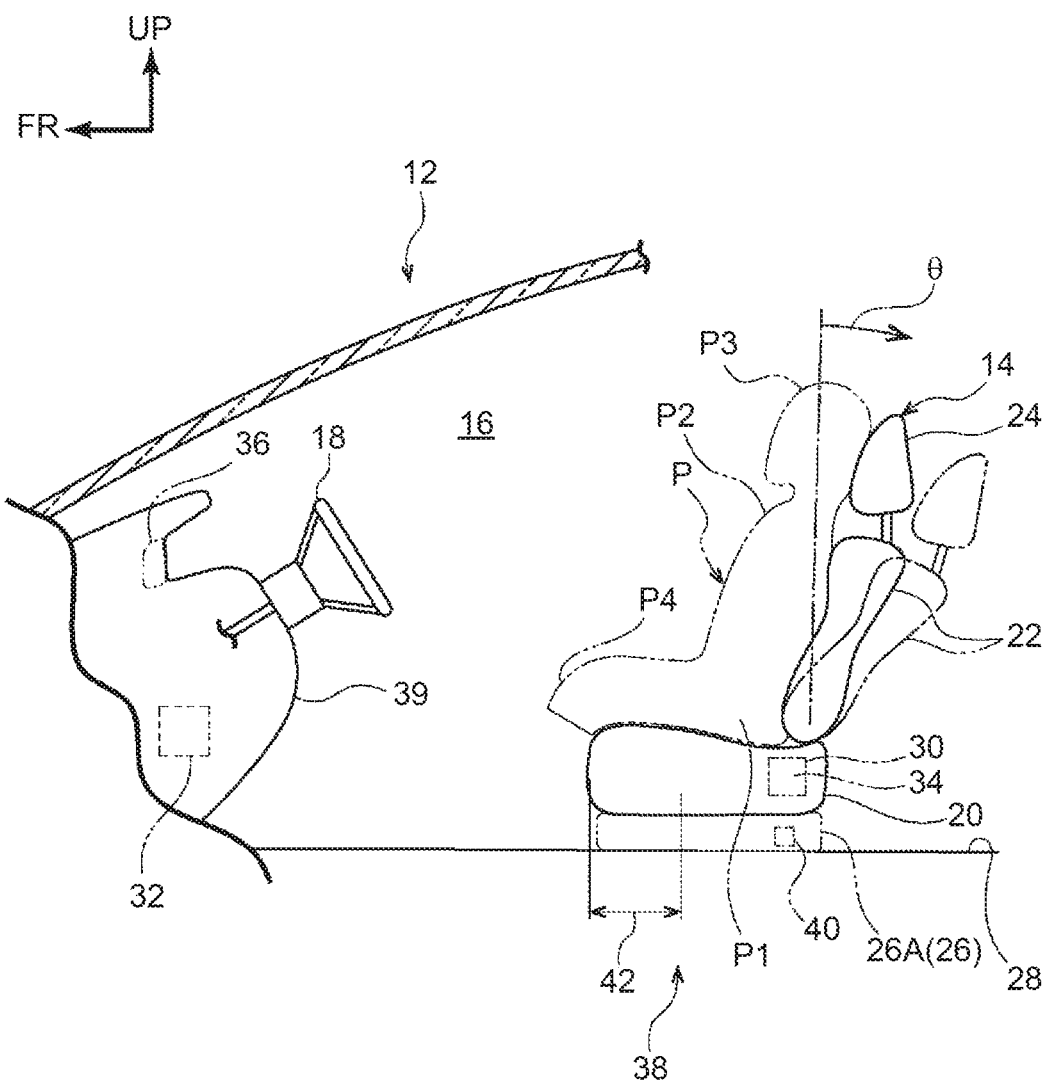
FIG. 5 is a side view showing the vehicle cabin including the vehicle seat control apparatus according to the second embodiment, showing a state in which the position of the vehicle seat is located on the rear side.
Figure 6:
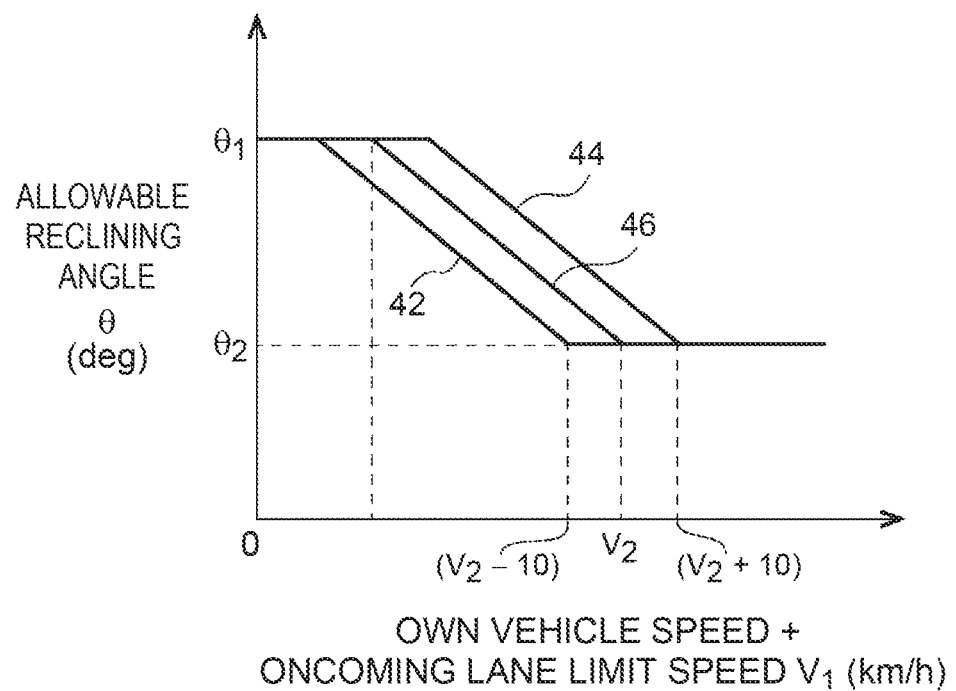
FIG. 6 is a graph showing a relationship between an own vehicle setting speed and the like and an allowable reclining angle when no road divider is provided in the second embodiment.

As shown in FIG. 5 and FIG. 6, in a state in which the front-rear position of the vehicle seat 14 is positioned in a rear region 42, the ECU 32 sets the threshold value of 3 the allowable reclining angle $\theta$ to be smaller than that in a state in which the front-rear position of the vehicle seat 14 is positioned in a front region 44 (see FIG. 4). In a state in which the front-rear position of the vehicle seat 14 is positioned in an intermediate region 46, the ECU 32 sets the threshold value $\theta$ of the allowable reclining angle $\theta$ to be smaller than that in the state in which the front-rear position of the vehicle seat 14 is positioned in the front region 44 (see FIG. 4), and sets the threshold value $\theta$ of the allowable reclining angle $\theta$ to be larger than that in a state in which the front-rear position of the vehicle seat 14 is positioned in the rear region 42 (see FIG. 5). In the present embodiment, as an example, in the state in which the front-rear position of the vehicle seat 14 is positioned in the intermediate region 46, the ECU 32 determines the allowable reclining angle $\theta$ as $\theta_2$ when the speed $V_1$ obtained by adding together the own vehicle speed and the oncoming lane limit speed is more than $v_2$ km/h. Further, in the state in which the front-rear position of the vehicle seat 14 is positioned in the front region 44, the ECU 32 sets the allowable reclining angle θ as $θ_2$ when the speed $V_1$ obtained by adding together the own vehicle speed and the oncoming lane limit speed is more than $v_2+10$ km/h. Further, in the state where the front-rear position of the vehicle seat 14 is positioned in the rear region 42, the ECU 32 determines the allowable reclining angle θ as $θ_2$ when the speed $V_1$ obtained by adding together the own vehicle speed and the oncoming lane limit speed is more than $v_2-10$ km/h.

Here, the rear region 42 is a region in which the vehicle seat 14 is positioned more rearward than a predetermined position (for an example, a position 200 mm behind from a position where the vehicle seat 14 is located on the most front side). Moreover, the front region 44 is a region ranging from a position where the vehicle seat 14 is located on the most front side to 100 mm behind this position, as an example. The intermediate region 46 is a region located between the rear region 42 and the front region 44.

When the ECU 32 determines that a road divider is provided on the road where the vehicle 12 is traveling, the ECU 32 determines the allowable reclining angle θ based on the speed of the vehicle 12 (own vehicle speed) and the front-rear position of the vehicle seat 14. Note that the processing by the ECU 32 in this case is the same as that of the first embodiment except for taking into consideration the front-rear position of the vehicle seat 14 in step S05 of FIG. 1C.

As described above, in the present embodiment, the motor 30 is controlled through setting the allowable reclining angle θ based on the presence or absence of a road divider, the front-rear position of the vehicle seat 14, the speed $V_1$ obtained by adding together the own vehicle speed and the oncoming lane limit speed, and the like. That is, when the vehicle seat 14 is positioned at a position where the submarine phenomenon is likely to occur and when it is assumed to have a high deceleration acceleration at the time of a frontal collision of the vehicle 12, the ECU 32 controls the motor 30 to set the reclining angle θ to be smaller. Thereby, at the time of a collision with a vehicle traveling in the oncoming lane, occurrence of the submarine phenomenon and deterioration of the restraint performance of the upper body of the seated occupant P are reduced, and increase in injury value of the seated occupant P is also reduced. Note that the processing by the ECU 32 of the present embodiment is substantially the same as the processing shown in FIG. 1C except for taking into consideration the front-rear position of the vehicle seat 14.

Further, it may be configured that, after the driving mode is switched from the manual driving to the automatic driving, the occupant P seated in the vehicle seat 14 can take a comfortable posture by moving the vehicle seat 14 rearward automatically or through switching operation by the occupant. Even in this configuration, it is possible to reduce increase in injury value of the occupant P by restricting the rearward movement of the vehicle seat 14 as described above.

Vehicle Seat Control Apparatus 48 According to Third Embodiment

A vehicle seat control apparatus 48 according to the third embodiment of the present disclosure will be described with reference to FIG. 7 to FIG. 9. Note that in the vehicle seat control apparatus 48 according to the third embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

As described above, depending on the front-rear position of the vehicle seat 14, at the time of a frontal collision of the vehicle 12, the legs of the occupant P seated in the vehicle seat 14 can be restrained by the instrument panel 39, the knee airbag, or the like in some cases. In this case, the submarine phenomenon hardly occurs. Therefore, as shown in FIG. 7 and FIG. 8, in the vehicle seat control apparatus 48 according to the present embodiment, taking into consideration the position (mostly, the front-rear, right-left, and up-down positions) of knees P4 of the occupant P seated in the vehicle seat 14, the threshold value of the allowable reclining angle θ of the seat back 22 is set. The position of the knees P4 of the occupant P seated in the vehicle seat 14 is detected by a knee detection camera 50, and the knee detection camera 50 is electrically connected to the ECU 32.

When the ECU 32 determines that no road divider is provided on the road where the vehicle 12 is traveling, the ECU 32 determines the allowable reclining angle θ based on the position of the knees P4 of the occupant P seated in the vehicle seat 14 as well as the speed $V_1$ obtained by adding together the speed of the vehicle 12 (own vehicle speed) and the limit speed of the road (oncoming lane limit speed) recorded in advance in the navigation system 36.

Figure 7:
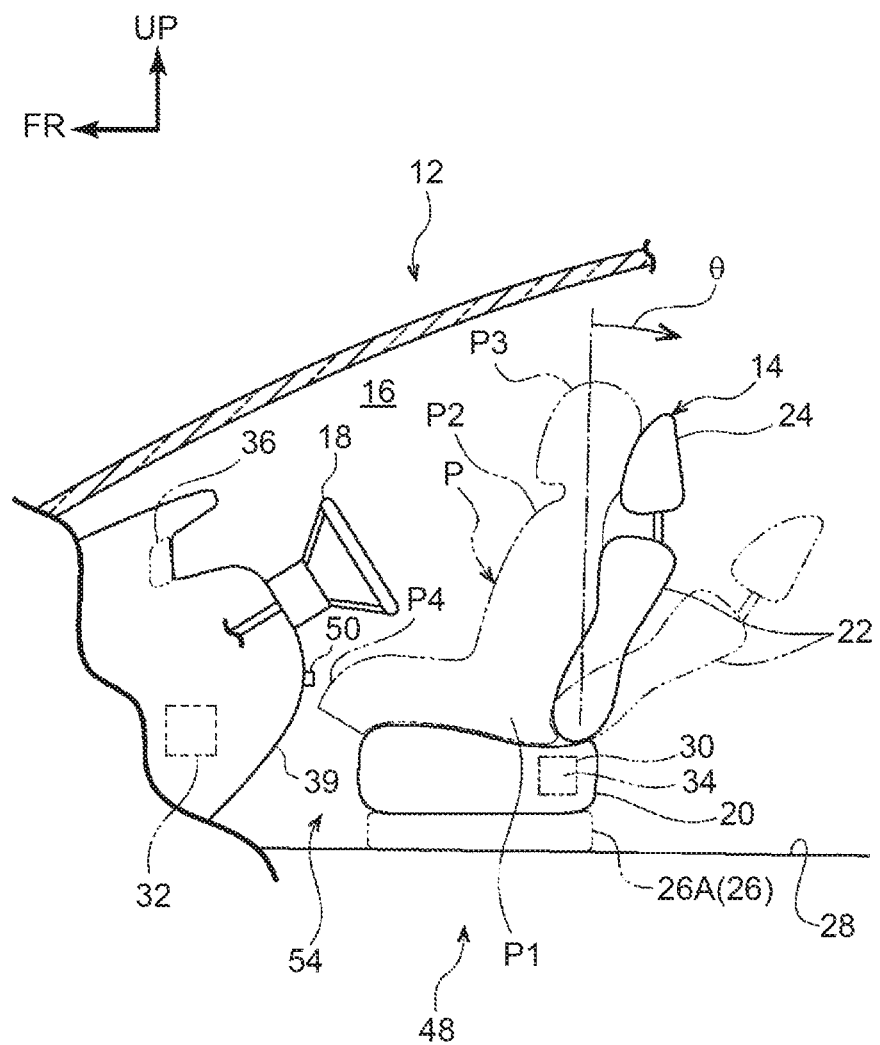
FIG. 7 is a side view showing a vehicle cabin including a vehicle seat control apparatus according to a third embodiment, showing a state in which the position of the vehicle seat is located on the front side.
Figure 8:
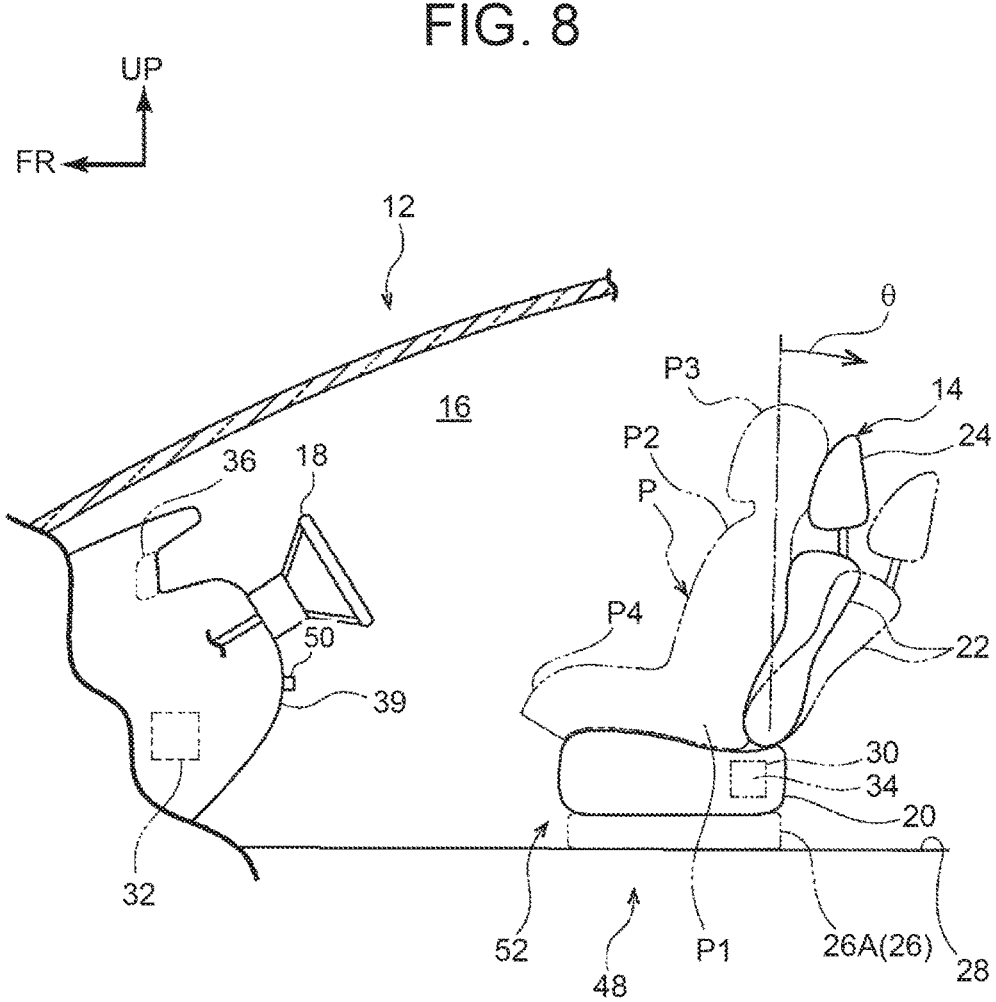
FIG. 8 is a side view showing the vehicle cabin including the vehicle seat control apparatus of the third embodiment, showing a state in which the position of the vehicle seat is located on the rear side.
Figure 9:
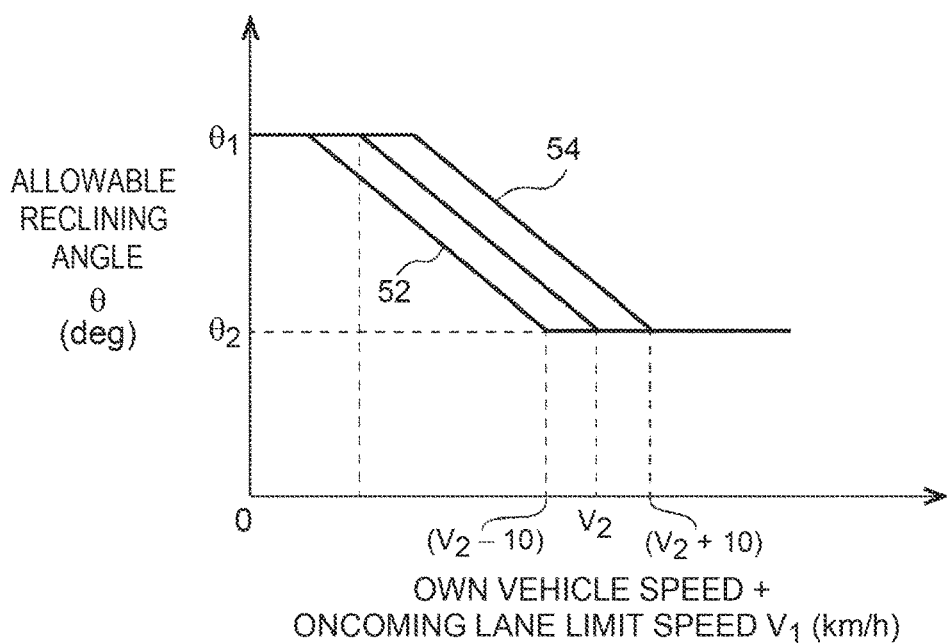
FIG. 9 is a graph showing a relationship between an own vehicle setting speed and the like and an allowable reclining angle in the case in which no road divider is provided in the third embodiment.

As shown in FIG. 8 and FIG. 9, because of the rearward arrangement of the front-rear position of the vehicle seat 14, etc., when a state 52, where it is difficult to restrain the knees P4 by the instrument panel 39 or the like, is detected by the knee detection camera 50, the ECU 32 sets the threshold value of the allowable reclining angle θ to be smaller than that in a state 54, where it is determined that the knees P4 of the occupant P seated in the vehicle seat 14 can be restrained by the instrument panel 39 or the like (state in which the occupant P is seated without crossing the legs as shown in FIG. 7). In the present embodiment, as an example, in the state 52 where it is difficult to restrain the knees P4 of the occupant P seated in the vehicle seat 14 by the instrument panel 39 or the like at the time of a frontal collision, when the speed $V_1$ obtained by adding together the own vehicle speed and the oncoming lane limit speed is more than $v_2-10$ km/h, the ECU 32 determines the allowable reclining angle θ as $θ_2$. In the state 54 where it is determined that the knees P4 of the occupant P seated in the vehicle seat 14 can be restrained by the instrument panel 39 and the like, when the speed $V_1$ obtained by adding together the own vehicle speed and the oncoming lane limit speed is more than $v_2+10$ km/h, the ECU 32 determines the allowable reclining angle θ as $θ_2$.

Even in the case in which the front-rear position of the vehicle seat 14 is located on the front side, when the state 52 in which it is difficult to restrain the knees P4 by the instrument panel 39 or the like is detected by the knee detection camera 50 because the occupant P seated in the vehicle seat 14 crosses the legs or the like, the ECU 32 sets the threshold value of the allowable reclining angle θ to be smaller than that in the state 54 in which it is determined that the knees P4 of the occupant P seated in the vehicle seat 14 can be restrained by the instrument panel 39 or the like (the state in which the occupant P is seated without crossing the legs, as shown in FIG. 7). Note that the processing by the ECU 32 of the present embodiment is substantially the same as the processing shown in FIG. 1C except for taking into consideration the front-rear position of the vehicle seat 14 and the knees P4 of the occupant P.

When the ECU 32 determines that a road divider is provided on the road where the vehicle 12 is traveling, the ECU 32 determines the allowable reclining angle θ based on the speed of the vehicle 12 (own vehicle speed) and the position of the knees P4 of the occupant P seated in the vehicle seat 14. Note that the processing by the ECU 32 in this case is the same as that of the first embodiment except for taking into consideration the position of the knees P4 of the occupant P in step S05 of FIG. 1C.

As described above, in the present embodiment, the motor 30 is controlled by setting the threshold value of the allowable reclining angle θ based on the presence or absence of a road divider, the position of the knees P4 of the occupant P seated in the vehicle seat 14, the speed $V_1$ obtained by adding together the own vehicle speed and the oncoming lane limit speed, and the like. That is, the ECU 32 controls the motor 30 to set the reclining angle θ to be small when it is assumed that the deceleration acceleration becomes higher at the time of a frontal collision of the vehicle 12 and when the occupant P is seated in the vehicle seat 14 in a state in which the submarine phenomenon is likely to occur. Thereby, at the time of a collision with a vehicle traveling in the oncoming lane, it is possible to reduce occurrence of the submarine phenomenon and impairment of the restraint performance of the upper body of the seated occupant P, to thus reduce increase in injury value of the seated occupant P.

Vehicle Seat Control Apparatus 56 According to Fourth Embodiment

A vehicle seat control apparatus 56 according to the fourth embodiment of the present disclosure will be described with reference to FIG. 10 to FIG. 12. Note that in the vehicle seat control apparatus 56 according to the fourth embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

Meanwhile, in the configuration in which the airbag 58 is developed from the steering wheel 18 at the time of a frontal collision of the vehicle, it is important to prevent the restraint performance of the head P3 of the occupant P seated in the vehicle seat 14 by the airbag 58 from being impaired at the time of a frontal collision of the vehicle 12. Therefore, as shown in FIG. 10 and FIG. 11, in the vehicle seat control apparatus 56 of the present embodiment, considering the position (mainly the front-rear and height positions) of the head P3 of the occupant P seated in the vehicle seat 14, that is, considering a distance L between the head P3 of the occupant P seated in the vehicle seat 14 and the airbag 58 after being developed, the threshold value of the allowable reclining angle θ of the seat back 22 is set. In the present embodiment, during the automatic driving of the vehicle 12, the distance L between the head P3 of the occupant P seated in the vehicle seat 14 and the airbag 58 after being developed is assumed to be within $I_1$ (900 mm) to $I_2$ (1200 mm), for example. The position of the head P3 of the occupant P seated in the vehicle seat 14 is detected by a head detection camera 60, and the head detection camera 60 is electrically connected to the ECU 32.

When the ECU 32 determines that no road divider is provided on the road where the vehicle 12 is traveling, the ECU 32 determines the allowable reclining angle θ based on the speed $V_1$ obtained by adding together the speed of the vehicle 12 (own vehicle speed) and the limit speed of the road (oncoming lane limit speed) recorded in advance in the navigation system 36, as well as the position of the head P3 of the occupant P seated in the vehicle seat 14.

Figure 10:
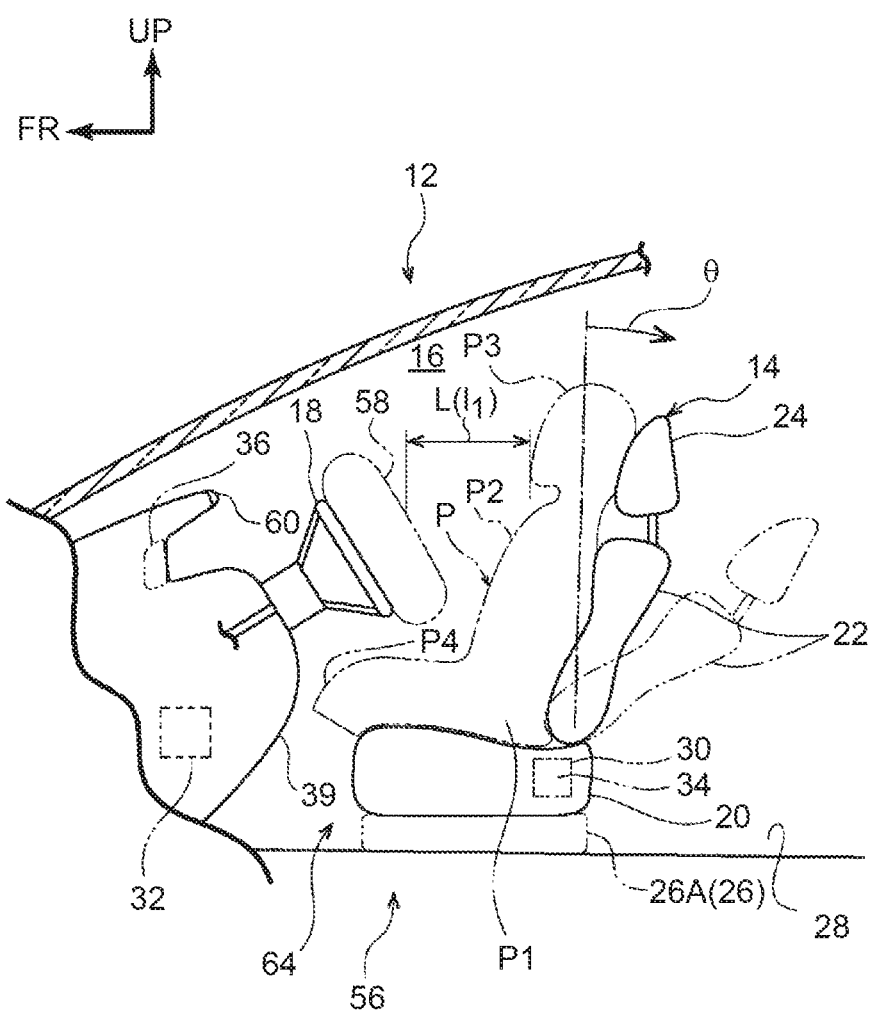
FIG. 10 is a side view showing a vehicle cabin including a vehicle seat control apparatus according to a fourth embodiment, showing a state in which the position of the vehicle seat is located on the front side.
Figure 11:
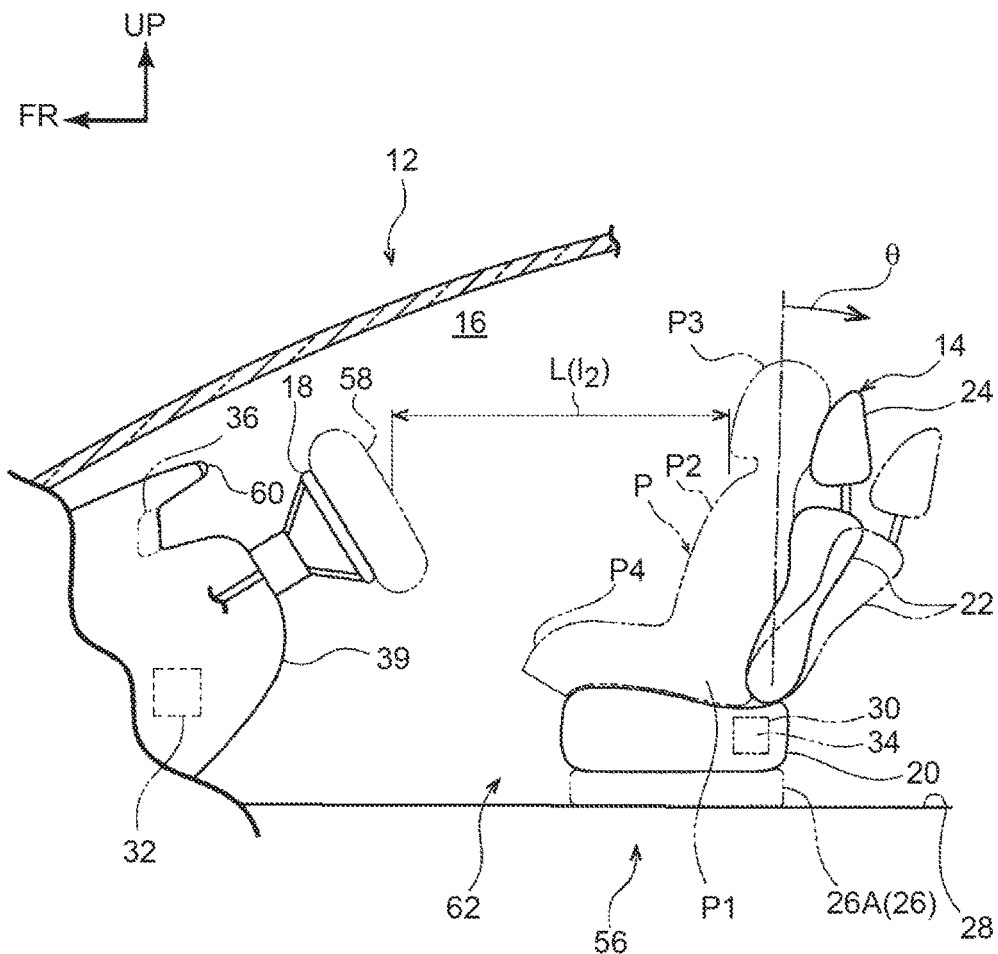
FIG. 11 is a side view showing the vehicle cabin including a vehicle seat control apparatus of a fourth embodiment, showing a state in which the position of the vehicle seat is located on the rear side.
Figure 12:
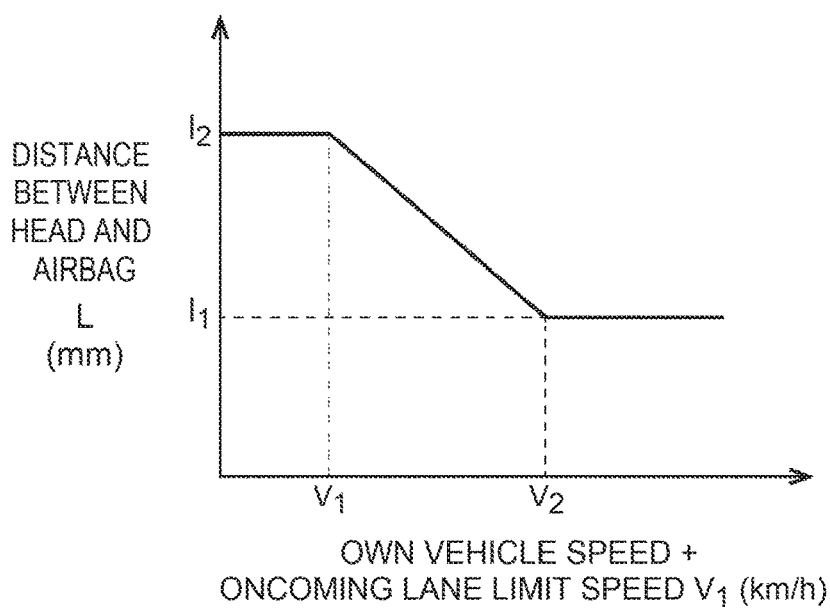
FIG. 12 is a graph showing a relationship between an own vehicle setting speed and an allowable reclining angle in the case in which no road divider is provided in the fourth embodiment.

As shown in FIG. 1I and FIG. 12, because of the rearward arrangement of the front-rear position of the vehicle seat 14, etc., when a state 62, in which the head P3 of the occupant P is difficult to be restrained by the airbag 58, is detected by a head detection camera 60, the ECU 32 sets the threshold value of the allowable reclining angle θ to be smaller than that in a state 64 in which it is determined that the head P3 of the occupant P seated in the vehicle seat 14 can be restrained by the airbag 58 or the like (see FIG. 10).

When the ECU 32 determines that a road divider is provided on the road where the vehicle 12 is traveling, the ECU 32 determines the allowable reclining angle θ based on the speed of the vehicle 12 (own vehicle speed) and the position of the head P3 of the occupant P seated in the vehicle seat 14. Note that the processing by the ECU 32 in this case is the same as that of the first embodiment except for taking into consideration the position of the head P3 of the occupant P in step S05 of FIG. 1C.

As described above, in the present embodiment, the motor 30 is controlled by setting the threshold value of the allowable reclining angle θ based on the presence or absence of a road divider, the position of the head P3 of the occupant P seated in the vehicle seat 14, the speed obtained by adding together the own vehicle speed and the oncoming lane limit speed, and the like. That is, the ECU 32 controls the motor 30 set the reclining angle θ to be smaller when deceleration acceleration of the vehicle 12 is assumed to be higher at the time of a frontal collision of the vehicle 12 and when the restraint performance of the head P3 of the occupant P by the airbag 58 may become deteriorated. Thereby, at the time of a collision with a vehicle traveling in the oncoming lane, it is possible to reduce impairment of the restraint performance of the head P3 of the seated occupant P, and also reduce increase in injury value of the seated occupant P. Note that the processing by the ECU 32 of the present embodiment is substantially the same as the processing shown in FIG. 1C except for taking into consideration the front-rear position of the vehicle seat 14 and the head position P3 of the occupant P.

Vehicle Seat Control Apparatus 66 According to Fifth Embodiment

A vehicle seat control apparatus 66 according to the fifth embodiment of the present disclosure will be described with reference to FIG. 13 and FIG. 14. Note that in the vehicle seat control apparatus 66 according to the fifth embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

As described above, depending on the front-rear position of the vehicle seat 14, the legs of the occupant P seated in the vehicle seat 14 can be restrained by the instrument panel 39 or the knee airbag (not shown), or the like at the time of a frontal collision of the vehicle 12 in some cases. For this reason, as shown in FIG. 13 and FIG. 14, in the vehicle seat control apparatus 66 of the present embodiment, the allowable position in the rearward movement of the vehicle seat 14 (seat cushion 20) is set depending on the presence or absence of a road divider. The front-rear position of the vehicle seat 14 (seat cushion 20) is detected by a seat position sensor 40, and the vehicle seat 14 is moved in the front-rear direction by operating a motor 68 for seat sliding as an actuator. The seat position sensor 40 and the motor 68 are electrically connected to the ECU 32.

Figure 14:
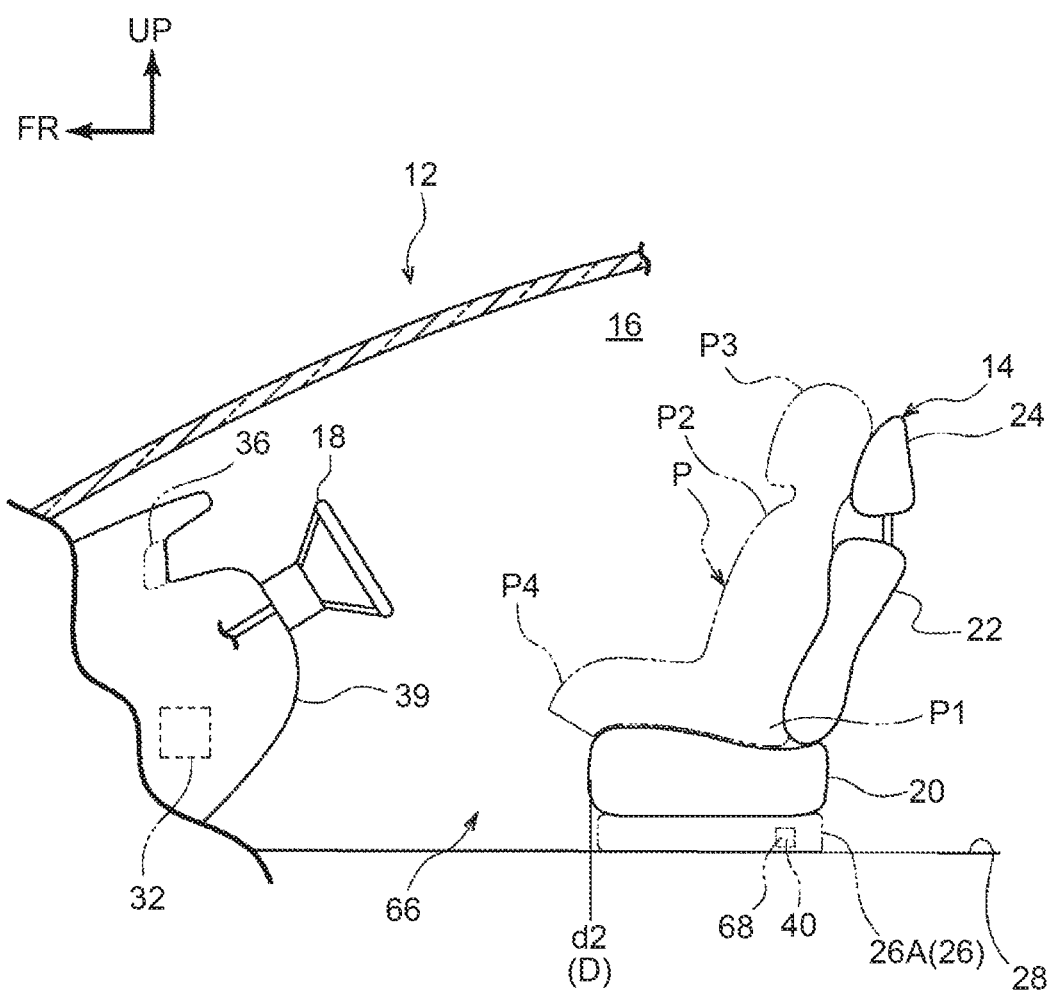
FIG. 14 is a side view showing the vehicle cabin including the vehicle seat control apparatus according to the fifth embodiment, showing a state in which the position of the vehicle seat is located on the rear side.

When the ECU 32 determines that a road divider is provided on the road where the vehicle 12 is traveling, the ECU 32 sets an allowable position D in the rearward movement of the vehicle seat 14 at d2, as shown in FIG. 14. Accordingly, in the case in which a road divider is provided on the road where the vehicle 12 is traveling, the vehicle seat 14 can be moved in the front-rear direction within a range between a position where the vehicle seat 14 is located on the most front side and the allowable position d2. As the motor 68 is operated, the vehicle seat 14 is moved rearward; and when the vehicle seat 14 reaches the position d2, the operation of the motor 68 is stopped.

Figure 13:
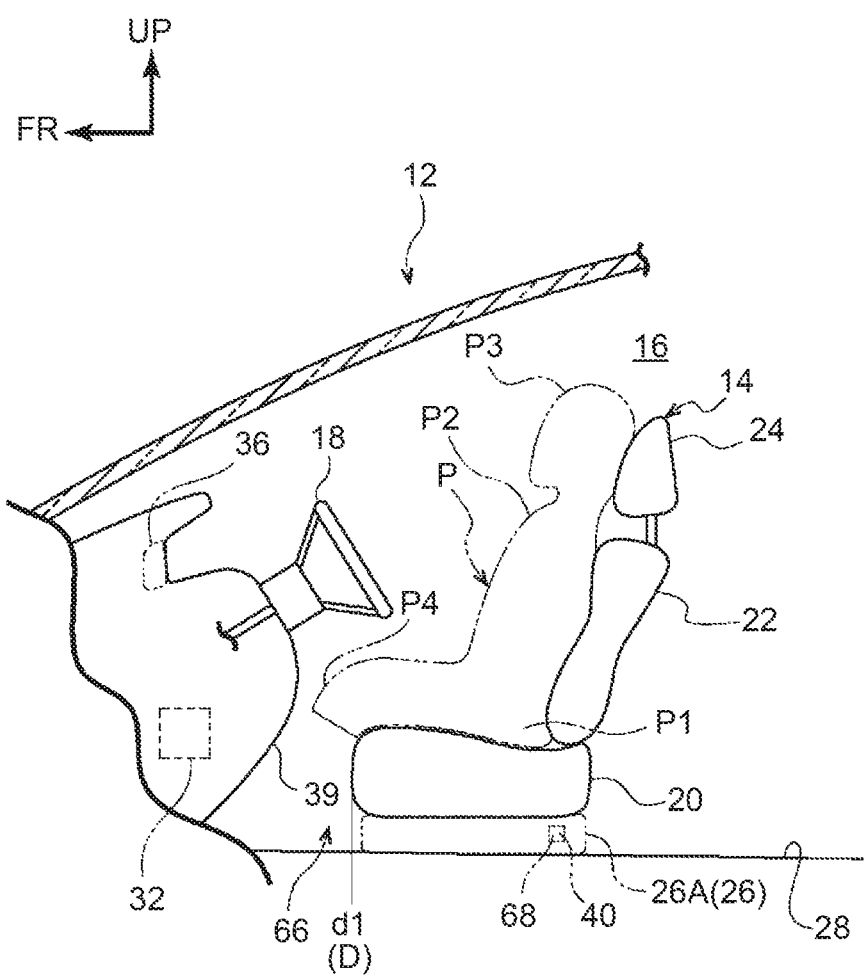
FIG. 13 is a side view showing a vehicle cabin including a vehicle seat control apparatus according to a fifth embodiment, showing a state in which the position of the vehicle seat is located on the front side.

On the other hand, when the ECU 32 determines that no road divider is provided on the road where the vehicle 12 is traveling, the ECU 32 sets the allowable position D in the rearward movement of the vehicle seat 14 at d1 shown in FIG. 13, which is located more frontward than d2 (see FIG. 14). Thereby, when no road divider is provided on the road where the vehicle 12 is traveling, it is possible to move the vehicle seat 14 in the front-rear direction within a range between the position where the vehicle seat 14 is located on the most front side and the allowable position d1. More specifically, as the motor 68 is operated, the vehicle seat 14 is moved rearward; and when the vehicle seat 14 reaches the position d1, the operation of the motor 68 is stopped.

As described above, in the present embodiment, the motor 68 is controlled by setting the allowable position D (threshold value) in the rearward movement of the vehicle seat 14 based on the presence or absence of a road divider. That is, when it is assumed to have a high deceleration acceleration at the time of a frontal collision of the vehicle 12 and when the vehicle seat 14 is positioned at a position where the submarine phenomenon is likely to occur, the ECU 32 controls the motor 68 so as to prevent the distance in the front-rear direction between the knees P4 of the occupant P seated in the vehicle seat 14 and the instrument panel 39 or the like from becoming longer. Thereby, at the time of a collision with a vehicle traveling in the oncoming lane, it is possible to reduce occurrence of the submarine phenomenon and reduce increase in injury value of the seated occupant P. Note that the processing by the ECU 32 by the present embodiment is substantially the same as the processing shown in FIG. 1C except that, instead of the allowable reclining angle θ, the allowable position in the rearward movement of the vehicle seat 14 is restricted.

Vehicle Seat Control Apparatus 70 According to Sixth Embodiment

A vehicle seat control apparatus 70 according to the sixth embodiment of the present disclosure will be described with reference to FIG. 15 and FIG. 16. Note that in the vehicle seat control apparatus 70 according to the sixth embodiment, members and parts corresponding to those of the vehicle seat control apparatus 10 according to the first embodiment will be denoted by the same reference numerals as those of the members and parts of the vehicle seat control apparatus 10, and the description thereof may be omitted.

Figure 15:
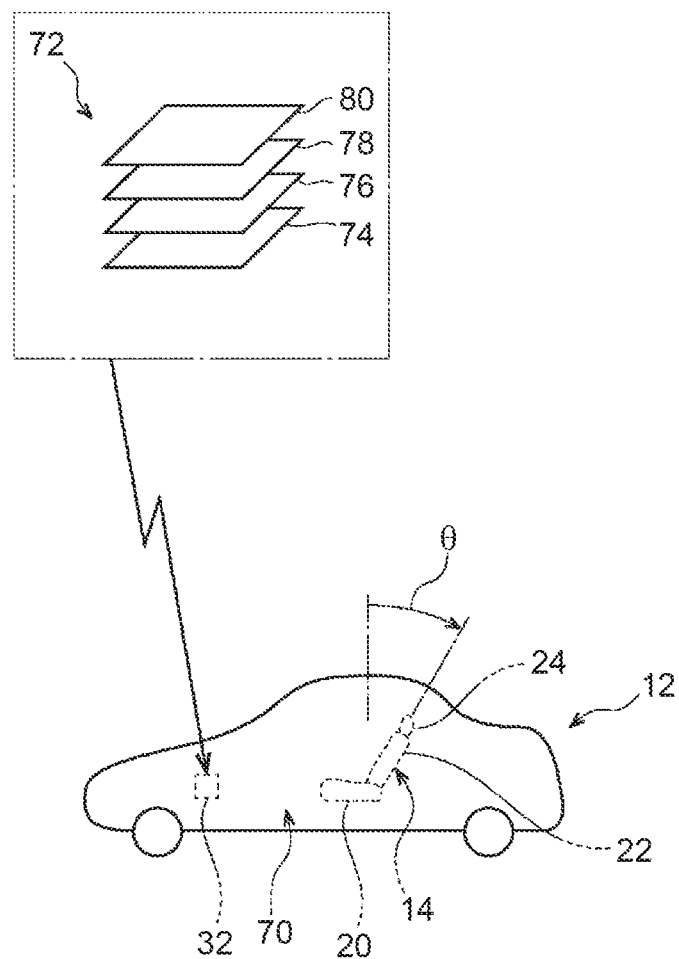
FIG. 15 is a side view schematically showing a vehicle including a vehicle seat control apparatus according to a sixth embodiment and a dynamic map.

As shown in FIG. 15, the vehicle seat control apparatus 70 of the present embodiment can acquire information on the road where the vehicle 12 is traveling by wireless communication, and set the threshold value of the allowable reclining angle θ based on the information on the road obtained by the wireless communication. Specifically, the ECU 32 can acquire information of a dynamic map 72 by the wireless communication.

Here, the dynamic map 72 is a high-accuracy three-dimensional map including various information on the road where the vehicle 12 is traveling, and is a map mainly including "static information 74", "quasi-static information 76", "quasi-dynamic information 78", and "dynamic information 80". The static information 74 is a map information as a base for a dynamic map regarding roads, road structures on the roads, lane information, road surface information, and permanent regulatory information, and this static information is updated every predetermined period. The quasi-static information 76 is information including: traffic regulation information about road works and events; wide-area weather information; and traffic jam prediction, and others, and is information that is updated more frequently than the static information 74. The quasi-dynamic information 78 is information including: actual traffic conditions and temporary travel restrictions, temporary travel failure conditions such as falling objects and disabled vehicles, actual accident conditions, and narrow-area weather information, etc., at a location or near a location where the vehicle 12 is traveling, and this information is updated more frequently than the quasi-static information 76. The dynamic information 80 includes: information transmitted and exchanged between vehicles; signal display information; information on pedestrians and bicycles at an intersection; and information on vehicles traveling straight at an intersection, and this information is updated more frequently than the quasi-dynamic information 78.

Figure 16:
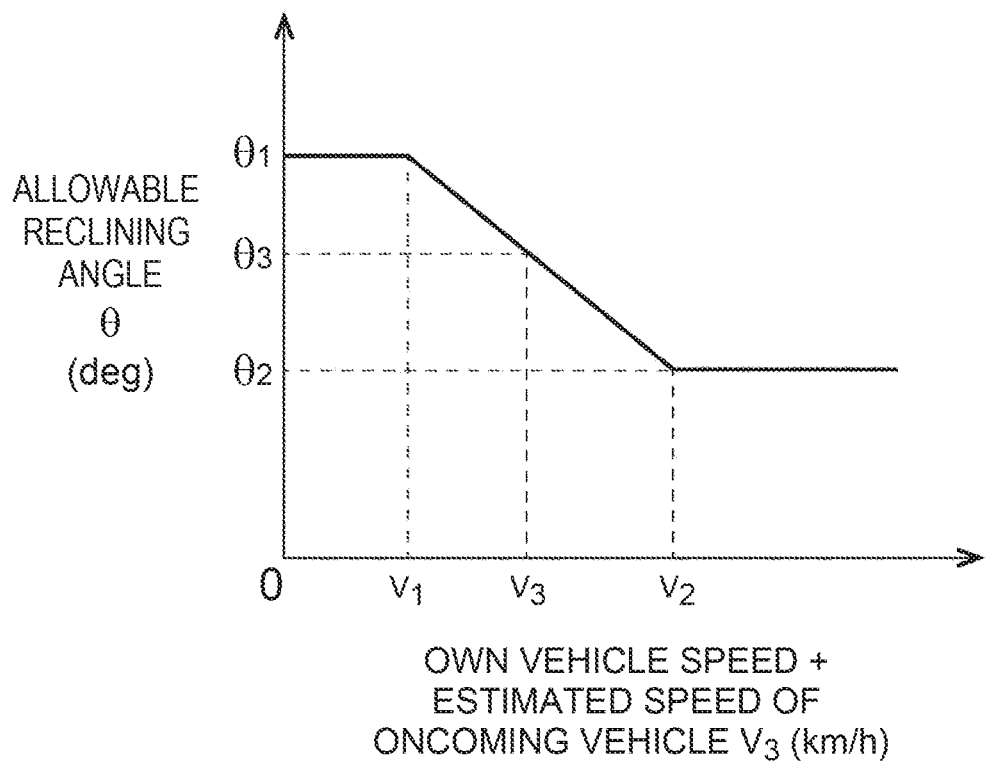
FIG. 16 is a graph showing a relationship between the own vehicle setting speed and the like and the allowable reclining angle in the case in which no road divider is provided in the sixth embodiment.

As shown in FIG. 15 and FIG. 16, when the ECU 32 determines that no road divider is provided on the road where the vehicle 12 is traveling based on the information of the dynamic map 72, the ECU 32 determines the allowable reclining angle θ based on the speed $V_3$ obtained by adding together the speed of the vehicle 12 (own vehicle speed) and the estimated speed of an oncoming vehicle. The "speed of the vehicle 12 (own vehicle speed)" is a setting speed or an actual speed of the vehicle 12 during the automatic driving. In addition, the estimated speed of the oncoming vehicle is a traveling speed of the oncoming vehicle estimated from the information of the dynamic map 72, and denotes an average traveling speed, the oncoming lane limit speed, and the like of the oncoming vehicle traveling in the oncoming lane opposite to the lane where the vehicle 12 is traveling.

When the speed $V_3$ obtained by adding together the own vehicle speed and the estimated speed of the oncoming vehicle is 0 km/h or more and $v_1$ km/h or less, the ECU 32 determines the allowable reclining angle θ as $θ_1$. When the speed $V_3$ obtained by adding together the own vehicle speed and the estimated speed of the oncoming vehicle is more than $v_2$ km/h, the ECU 32 determines the allowable reclining angle θ as $θ_2$. Further, when the speed $V_3$ obtained by adding together the own vehicle speed and the estimated speed of the oncoming vehicle is more than $v_1$ km/h and less than $v_2$ km/h, the ECU 32 determines the allowable reclining angle θ as the angle $θ_3$, which corresponds to the speed $v_3$ obtained by adding together the own vehicle speed and the oncoming lane limit speed. In the present embodiment, $θ_3$ is calculated through proportional interpolation between ($v_1$, $θ_1$) and ($v_2$, $θ_2$) shown in the graph of FIG. 16. The above processing by the ECU 32 is the same as the aforementioned processing of the vehicle seat control apparatus 10 of the first embodiment except that the allowable reclining angle θ is determined based on the speed $V_3$.

Further, by updating the information of the dynamic map 72, the allowable reclining angle θ is set to be smaller when the average traveling speed of the oncoming vehicle traveling in the oncoming lane becomes higher or when the oncoming lane limit speed becomes higher. In this case, the ECU 32 starts energizing the motor 30. As a result, the seat back 22 is inclined to an angle equal to or smaller than the threshold value of the reclining angle θ determined after the information of the dynamic map 72 is updated.

In addition, when the information of the dynamic map 72 is updated, the allowable reclining angle θ may be rapidly smaller when the average traveling speed of the oncoming vehicle traveling in the oncoming lane rapidly becomes higher. In this case, even when the ECU 32 starts energization for the motor 30, the seat back 22 cannot be inclined quickly in some cases. In this case, the ECU 32 starts energizing the motor 30 and activates automatic braking to incline the seat back 22 forward as well as decelerate the vehicle 12. In addition to this, the ECU 32 may be configured to output a signal for lighting a lamp or displaying for noticing deceleration of the vehicle 12 to the following vehicle.

Here, when the estimated speed of the oncoming vehicle is set by using an average traveling speed of the oncoming vehicle traveling in the oncoming lane, the allowable reclining angle θ may be set more preferentially, as compared to the case in which the estimated speed of the oncoming vehicle is set by using the oncoming lane limit speed. For example, when the average traveling speed of the oncoming vehicle traveling in the oncoming lane is lower than the oncoming lane limit speed, the allowable reclining angle θ can be larger than that in the case of setting the estimated speed of the oncoming vehicle by using the oncoming lane limiting speed.

When the ECU 32 determines that a road divider is provided on the road where the vehicle 12 is traveling based on the information of the dynamic map 72, the ECU 32 determines the allowable reclining angle θ based on the speed $V_2$ (own vehicle speed) of the vehicle 12, as shown in FIG. 3. That is, when the ECU 32 determines that a road divider is provided on the road where the vehicle 12 is traveling based on the information of the dynamic map 72, the same processing as that in the first embodiment is performed. The allowable reclining angle θ may be determined based on the estimated speed of the vehicle 12. Here, the estimated speed of the vehicle 12 is the traveling speed of the vehicle 12 estimated from the information of the dynamic map 72, which includes an average traveling speed of vehicles traveling in the lane where which the vehicle 12 is traveling, a limit speed of the lane where the vehicle 12 is traveling, and others. Note that the processing by the ECU 32 of the present embodiment is almost the same as the processing shown in FIG. 1C except for taking into consideration the information from the dynamic map 72.

Even in the case in which the ECU 32 determines that a road divider is provided on the road where the vehicle 12 is traveling based on the static information 74 of the dynamic map 72, when the ECU 32 determines that two-way traffic in in effect on the road where the vehicle 12 is traveling based on the quasi-static information 76 and the quasi-dynamic information 78 of the dynamic map 72, the ECU 32 determines the allowable reclining angle θ, assuming that no road divider is provided, as shown in FIG. 16. This means that the ECU 32, while switching the control from the control for the case in which the road divider is provided to the control for the case in which no road divider is provided, controls the vehicle seat 14.

In the present embodiment, the threshold value of the allowable reclining angle θ is set based on the information of the dynamic map 72; and similarly, the threshold value of the allowable position in rearward movement of the vehicle seat 14 may be set based on the information of the dynamic map 72.

Vehicle Seat Control Apparatus 82 According to Seventh Embodiment

A vehicle seat control apparatus 82 according to the seventh embodiment of the present disclosure will be described with reference to FIG. 16 and FIG. 17. Note that in the vehicle seat control apparatus 82 according to the seventh embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

Figure 17:
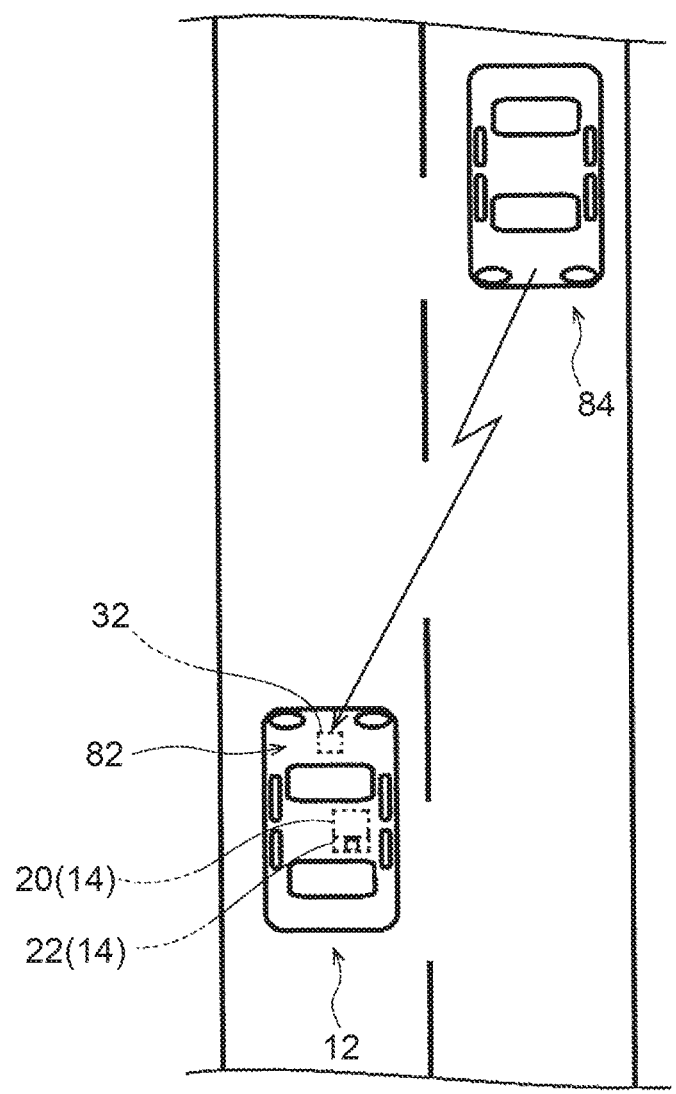
FIG. 17 is a plan view showing a traveling state of a vehicle including a vehicle seat control apparatus according to a seventh embodiment.

As shown in FIG. 17, the vehicle seat control apparatus 82 according to the present embodiment can acquire information on an oncoming vehicle 84 by wireless communication as vehicle-to-vehicle communication, and sets the threshold value of the allowable reclining angle θ based on the information on the oncoming vehicle 84 acquired through this wireless communication. In the vehicle seat control apparatus 82 of the present embodiment, the ECU 32 can acquire the above-described information from the navigation system 36 (see FIG. 1B) and the above-described information of the dynamic map 72 (see FIG. 15).

When the ECU 32 determines that no road divider is provided on the road where the vehicle 12 is traveling based on the information from the navigation system 36 or the information of the dynamic map 72, as shown in FIG. 16 and FIG. 17, the ECU 32 determines the allowable reclining angle θ based on the speed $V_3$ obtained by adding together the speed of the vehicle 12 (own vehicle speed) and the estimated speed of the oncoming vehicle 84. The "speed of the vehicle 12 (own vehicle speed)" is a setting speed or an actual speed of the vehicle 12 during the automatic driving. Further, the estimated speed of the oncoming vehicle 84 is a traveling speed of the oncoming vehicle 84 estimated from the information if the information on the oncoming vehicle 84 is already acquired through the wireless communication. The estimated speed of the oncoming vehicle 84 is determined based on the information such as a travel route and a speed signal that are part of the information on the oncoming vehicle 84 acquired through the wireless communication. The processing by the ECU 32 after the ECU 32 determines the estimated speed of the oncoming vehicle 84 is the same, as the above-described processing of the vehicle seat control apparatus 70 according to the sixth embodiment.

When the ECU 32 determines that a road divider is provided on the road where the vehicle 12 is traveling based on the information from the navigation system 36 or the information of the dynamic map 72, as shown in FIG. 3, ECU 32 determines the allowable reclining angle θ based on the speed $V_2$ of the vehicle 12 (own vehicle speed). That is, when the ECU 32 determines that a road divider is provided on the road where the vehicle 12 is traveling based on the information from the navigation system 36 or the information of the dynamic map 72, the same processing as that in the first embodiment is performed.

Vehicle Seat Control Apparatus 86 According to Eighth Embodiment

A vehicle seat control apparatus 86 according to the eighth embodiment of the present disclosure will be described with reference to FIG. 16 and FIG. 18. Note that in the vehicle seat control apparatus 86 according to the eighth embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

Figure 18:
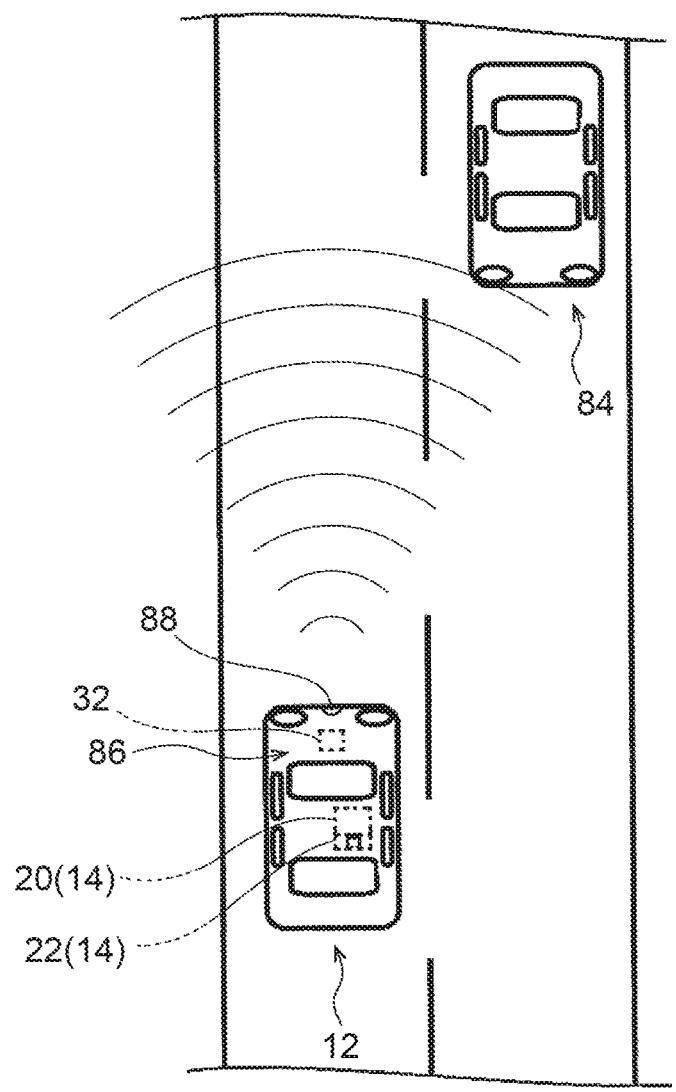
FIG. 18 is a plan view showing a traveling state of a vehicle including a vehicle seat control apparatus of an eighth embodiment.

As shown in FIG. 18, the vehicle seat control apparatus 86 according to the present embodiment can acquire speed information on the oncoming vehicle 84 by a radar 88 as a sensor provided in the vehicle 12, and sets the threshold value of the allowable reclining angle θ based on the speed information on the oncoming vehicle 84 acquired by this radar 88. The vehicle seat control apparatus 86 of the present embodiment can detect presence or absence of a road divider by the radar 88. In the vehicle seat control apparatus 86 of the present embodiment, the ECU 32 can acquire the above-described information from the navigation system 36 (see FIG. 1B) and the above-described information of the dynamic map 72 (see FIG. 15).

When the ECU 32 determines that no road divider is provided on the road where the vehicle 12 is traveling based on the information from the navigation system 36 or the information of the dynamic map 72, as shown in FIG. 16 and FIG. 18, the ECU 32 determines the allowable reclining angle θ based on the speed $V_3$ obtained by adding together the speed of the vehicle 12 (own vehicle speed) and the estimated speed of the oncoming vehicle 84. The "speed of the vehicle 12 (own vehicle speed)" is a setting speed or an actual speed of the vehicle 12 during the automatic driving. Further, the estimated speed of the oncoming vehicle 84 is a traveling speed of the oncoming vehicle 84 estimated from the speed information if the speed information on the oncoming vehicle 84 is already acquired by the radar 88. After the speed information on the oncoming vehicle 84 is already acquired by the radar 88, the ECU 32 determines the traveling speed of the oncoming vehicle 84 corresponding to the speed information as the estimation speed of the oncoming vehicle 84. The processing by the ECU 32 after the ECU 32 determines the estimated speed of the oncoming vehicle 84 is the same as the above-described processing of the vehicle seat control apparatus 70 according to the sixth embodiment.

When the ECU 32 determines that a road divider is provided on the road where the vehicle 12 is traveling based on the information from the navigation system 36, the information of the dynamic map 72, or the information from the radar 88, as shown in FIG. 3, the ECU 32 determines the allowable reclining angle θ based on the speed $V_2$ of the vehicle 12 (own vehicle speed). That is, when the ECU 32 determines that a road divider is provided on the road where the vehicle 12 is traveling based on the information from the navigation system 36 and the information of the dynamic map 72, the same processing as that in the first embodiment is performed.

Vehicle Seat Control Apparatus 90 According to Ninth Embodiment

A vehicle seat control apparatus 90 according to the ninth embodiment of the present disclosure will be described with reference to FIG. 16 and FIG. 19. Note that in the vehicle seat control apparatus 90 according to the ninth embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

Figure 19:
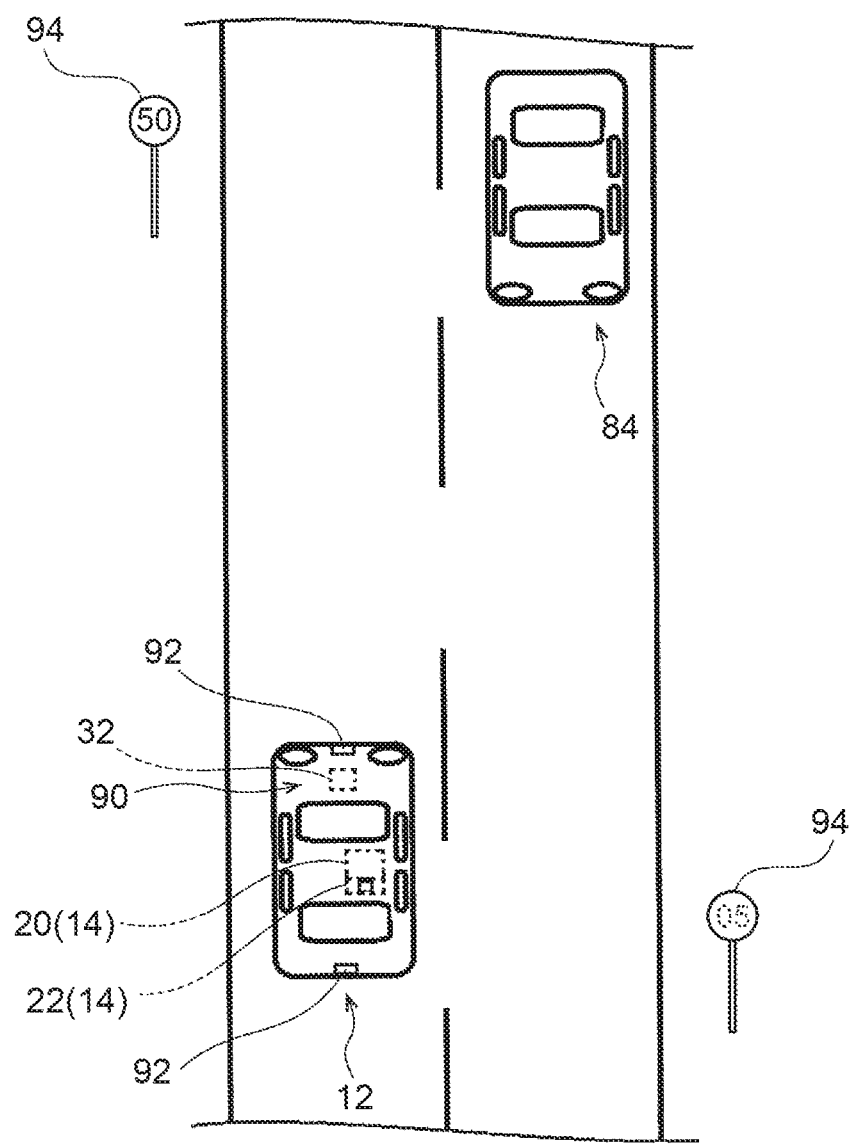
FIG. 19 is a plan view showing a traveling state of a vehicle including a vehicle seat control apparatus according to a ninth embodiment.

As shown in FIG. 19, the vehicle seat control apparatus 90 of the present embodiment can acquire information on a lane where at least one of the vehicle 12 and the oncoming vehicle 84 is traveling by a pair of front and rear cameras 92 as sensors provided in the vehicle 12, and sets the threshold value of the allowable reclining angle θ based on the lane information obtained by the cameras 92.

When the ECU 32 determines that no road divider is provided on the road where the vehicle 12 is traveling based on the information from the cameras 92, the ECU 32 determines the allowable reclining angle θ based on the speed $V_3$ obtained by adding together the speed of the vehicle 12 (own vehicle speed) and the estimated speed of the oncoming vehicle 84. The "speed of the vehicle 12 (own vehicle speed)" is a setting speed or an actual speed of the vehicle 12 during the automatic driving. Further, the estimated speed of the oncoming vehicle 84 is an oncoming lane limit speed indicated by a road sign 94 when information on the road sign 94 that is part of the information on the oncoming lane where the oncoming vehicle 84 is traveling is already acquired by only the rear camera 92 of the vehicle 12. In the vehicle 12 having only the front camera 92, a limit speed indicated on the road sign 94 of the lane where the vehicle 12 is traveling may be defined as the estimated speed of the oncoming vehicle 84. The processing by the ECU 32 after the ECU 32 determines the estimated speed of the oncoming vehicle 84 is the same as the above-described processing of the vehicle seat control apparatus 70 according to the sixth embodiment.

In addition, when the ECU 32 determines that a road divider is provided on the road where the vehicle 12 is traveling based on information from the cameras 92, the allowable reclining angle θ is determined based on the speed $V_2$ of the vehicle 12 (own vehicle speed) as shown in FIG. 3. That is, when the ECU 32 determines that a road divider is provided on the road where the vehicle 12 is traveling based on the information from the cameras 92, the same processing as that in the first embodiment is performed.

Vehicle Seat Control Apparatus 96 According to Tenth Embodiment

A vehicle seat control apparatus 96 according to the tenth embodiment of the present disclosure will be described with reference to FIG. 20 and FIG. 21. Note that in the vehicle seat control apparatus 96 according to the tenth embodiment, members and parts corresponding to those of the vehicle seat control apparatus 10 according to the first embodiment will be denoted by the same reference numerals as corresponding members and parts of the vehicle seat control apparatus 10, and the description thereof may be omitted.

Figure 20:
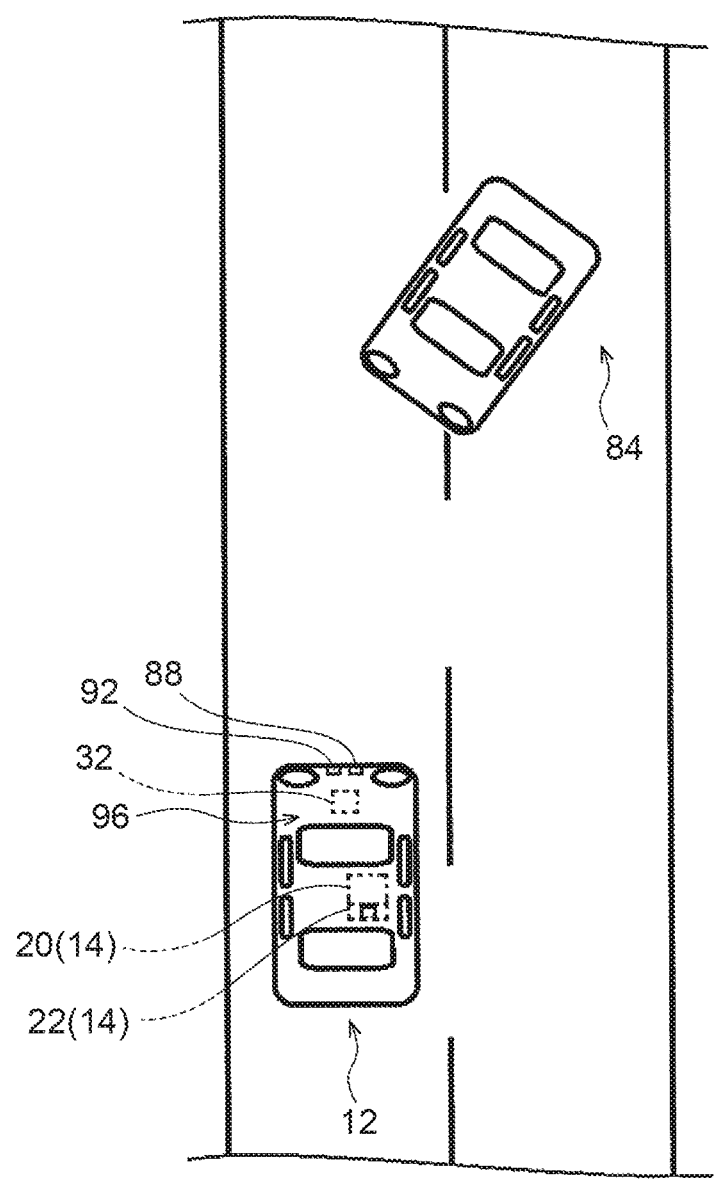
FIG. 20 is a plan view showing a traveling state of a vehicle including a vehicle seat control apparatus of a tenth embodiment.

As shown in FIG. 20, the vehicle seat control apparatus 96 according to the present embodiment is provided in the vehicle 12 capable of traveling by the automatic driving. Therefore, deceleration by the automatic braking can be expected when a collision with the oncoming vehicle 84 is predicted based on the information from the radar 88, the cameras 92, or the like. Therefore, the vehicle seat control apparatus 96 of the present embodiment sets the threshold value of the reclining angle θ, taking into consideration a deceleration amount α of the vehicle 12 that can be expected by the automatic braking. The vehicle seat control apparatus 96 according to the present embodiment can acquire the above-described information from the navigation system 36 (see FIG. 1B) or the above-described information of the dynamic map 72 (see FIG. 15).

As shown in FIG. 20 and FIG. 21, when the ECU 32 determines that no road divider is provided on the road where the vehicle 12 is traveling based on the information from the navigation system 36 or the information of the dynamic map 72, the ECU 32 determines the allowable reclining angle θ based on a speed $V_4$ obtained by adding together the estimated speed of the oncoming vehicle 84 and a speed obtained by subtracting the deceleration amount α expected by the automatic braking from the speed of the vehicle 12 (own vehicle speed) that is the estimated speed of the vehicle 12. The "speed of the vehicle 12 (own vehicle speed)" is a setting speed or an actual speed of the vehicle 12 during the automatic driving. In addition, the deceleration amount α that can be expected by the automatic braking is a variable that varies depending on the speed of the vehicle 12, the road surface conditions, and the like, and is determined from the information recorded in advance in the ECU 32. Furthermore, the estimated speed of the oncoming vehicle 84 is a traveling speed of the oncoming vehicle 84 estimated from the information of the dynamic map 72 and the like. In the following description, the "speed obtained by subtracting the deceleration amount α expected by the automatic braking from the speed of the vehicle 12 (own vehicle speed)" is referred to as a "speed after the deceleration of the vehicle 12". The deceleration amount α that can be expected by the automatic braking may be determined based on the "international standards for Advanced Emergency Braking System (AEBS)", which is the international standards established at the 178th meeting of the World Forum for Harmonizing Automotive Standards (WP29) of the United Nations. According to the international standards for Advanced Emergency Braking System (AEBS), the followings are specified: "while traveling at 40 km/h, there is no risk of a collision with a stationary vehicle ahead"; "while traveling at 60 km/h, there is no risk of a collision with a vehicle traveling ahead at 20 km/h"; and "while traveling at 30 km/h, there is no risk of a collision with a pedestrian walking and crossing the road at 5 km/h".

When the speed $V_4$ obtained by adding together the speed after the deceleration of the vehicle 12 and the estimated speed of the oncoming vehicle 84 is 0 km/h or more and $v_1$ km/h or less, the ECU 32 determines the allowable reclining angle θ as $θ_1$. When the speed $V_4$ obtained by adding together the speed after the deceleration of the vehicle 12 and the estimated speed of the oncoming vehicle 84 is more than $v_2$ km/h, the ECU 32 determines the allowable reclining angle θ as $θ_2$. Moreover, when the speed $V_4$ obtained by adding together the speed after the deceleration of the vehicle 12 and the estimated speed of the oncoming vehicle 84 is the speed $v_3$ that is more than $v_1$ km/h and less than $v_2$ km/h, the ECU 32 sets the allowable reclining angle θ as the angle $θ_3$ corresponding to the speed $V_3$ obtained by adding together the own vehicle speed and the oncoming line limit speed of the oncoming vehicle 84. In the present embodiment, $θ_3$ is calculated through proportional interpolation between $(v_1, θ_1)$ and $(v_2, θ_2)$ shown in the graph of FIG. 21.

When the ECU 32 determines that a road divider is provided on the road where the vehicle 12 is traveling based on the information from the navigation system 36 or the information of the dynamic map 72, the ECU 32 determines the allowable reclining angle θ based on the speed $V_2$ of the vehicle 12 (own vehicle speed), as shown in FIG. 3. That is, when the ECU 32 determines that a road divider is provided on the road where the vehicle 12 is traveling based on information from the navigation system 36 or the information of the dynamic map 72, the same processing as that in the first embodiment is performed.

In the above-described present embodiment, the allowable reclining angle θ can be set more appropriately by taking into consideration the deceleration amount α of the vehicle 12 that can be expected by the automatic braking. That is, in the present embodiment, the allowable reclining angle θ can be set to be larger, as compared with the case without taking into consideration the deceleration amount α of the vehicle 12 that can be expected by the automatic braking.

The vehicle seat control apparatus may be configured by mutually combining the configurations and threshold values of the respective embodiments described above. Further, the vehicle seat control apparatus of the present disclosure may be applied to a vehicle that can travel by only the automatic driving.

Although one embodiment of the present disclosure has been described above, the present disclosure is not limited to the above embodiment, and various modifications other than the above-described embodiment can be implemented without departing from the spirit of the present disclosure.

What is claimed is:

1. A control apparatus of a vehicle seat comprising:
   at least one actuator provided in a vehicle configured to travel by automatic driving, the actuator being configured to adjust at least one of a reclining angle or a position of the vehicle seat in a seat front-rear direction, and the reclining angle being an angle of a seat back of the vehicle seat in a seat rearward direction relative to a seat cushion of the vehicle seat; and
   an electronic control unit configured to
      determine whether or not a road divider is provided on a road where the vehicle is traveling and
      perform, when determining that no road divider is provided, at least any one of
         1) controlling the actuator not to incline the seat back rearward at an angle more than a predetermined angle,
         2) controlling the actuator not to position the vehicle seat at a position more rearward than a predetermined position,
         3) outputting a warning signal when the seat back is inclined rearward at an angle more than the predetermined angle, and
         4) outputting a warning signal when the vehicle seat is positioned at a position more rearward than the predetermined position.

2. The control apparatus according to claim 1, wherein the electronic control unit is configured to, when the electronic control unit determines that the road divider is provided, set at least one of the predetermined angle and the predetermined position based on at least one of a traveling speed of the vehicle and an estimated speed of the vehicle.

3. The control apparatus according to claim 2, wherein the electronic control unit is configured to define a speed obtained by subtracting a deceleration amount by automatic braking from the traveling speed of the vehicle as the estimated speed of the vehicle.

4. The control apparatus according to claim 2, wherein:
   the vehicle seat includes the actuator for reclining that adjusts the reclining angle of the seat back rearward in the seat front-rear direction;
   the electronic control unit is configured to
      when the electronic control unit determines that no road divider is provided on the road where the vehicle is traveling by the automatic driving, control the actuator for reclining such that the reclining angle becomes smaller than a first reclining angle in a case in which the electronic control unit determines that the road divider is provided, or
      when the electronic control unit determines that no road divider is provided on the road where the vehicle is traveling, output the warning signal at the reclining angle smaller than the first reclining angle in a case in which the electronic control unit determines that the road divider is provided; and the electronic control unit is configured to stop an inclination of the seat back by stopping an operation of the actuator for reclining when the reclining angle reaches the predetermined angle.

5. The control apparatus according to claim 2, wherein:
the vehicle seat includes the actuator for seat sliding that adjusts the position of the vehicle seat in the seat front-rear direction;
the electronic control unit is configured to
when the electronic control unit determines that no road divider is provided on the road where the vehicle is traveling by the automatic driving, control the actuator for seat sliding so as to position the vehicle seat more frontward than in a case in which the electronic control unit determines that the road divider is provided, or
when the electronic control unit determines that no road divider is provided on the road where the vehicle is traveling, output a warning signal in a state in which the vehicle seat is positioned more frontward than in the case in which the electronic control unit determines that the road divider is provided; and
the vehicle seat is configured to stop movement in the seat front-rear direction of the vehicle seat by the electronic control unit stopping operation of the actuator for seat sliding when the position of the vehicle seat in the seat front-rear direction reaches the predetermined position.

6. The control apparatus according to claim 2, wherein:
the vehicle seat includes the actuator for seat sliding that adjusts the position of the vehicle seat in the seat front-rear direction;
the electronic control unit is configured to
when the electronic control unit determines that no road divider is provided on the road where the vehicle is traveling by the automatic driving, control the actuator for seat sliding so as to position the vehicle seat more frontward than in a case in which the electronic control unit determines that the road divider is provided, or
when the electronic control unit determines that no road divider is provided on the road where the vehicle is traveling, output a warning signal in a state in which the vehicle seat is positioned more frontward than in the case in which the electronic control unit determines that the road divider is provided; and
the vehicle seat is configured to move frontward by the electronic control unit operating the actuator for seat sliding such that the position of the vehicle seat is positioned at the predetermined position or at a position more frontward than the predetermined position in the seat front-rear direction.

7. The control apparatus according to claim 1, wherein the electronic control unit is configured to, when the electronic control unit determines that no road divider is provided, set at least one of the predetermined angle and the predetermined position based on at least an estimated speed of an oncoming vehicle that is traveling in an oncoming lane of the road where the vehicle is traveling.

8. The control apparatus according to claim 7, wherein the electronic control unit is configured to, when the electronic control unit determines that no road divider is provided, set at least one of the predetermined angle and the predetermined position, based on a summed speed of a traveling speed of the vehicle and the estimated speed of the oncoming vehicle or a summed speed of an estimated speed of the vehicle and the estimated speed of the oncoming vehicle.

9. The control apparatus according to claim 7, wherein the electronic control unit is configured to:
acquire information on the road where the vehicle is traveling by wireless communication; and
determine the estimated speed of the oncoming vehicle based on the information on the road acquired by the wireless communication.

10. The control apparatus according to claim 7, wherein the electronic control unit is configured to:
acquire information from the oncoming vehicle by wireless communication; and
determine the estimated speed of the oncoming vehicle based on the information acquired by the wireless communication.

11. The control apparatus according to claim 7, wherein the electronic control unit is configured to:
acquire speed information of the oncoming vehicle by a sensor provided in the vehicle; and
determine the estimated speed of the oncoming vehicle based on the speed information of the oncoming vehicle acquired from the sensor.

12. The control apparatus according to claim 7, wherein the electronic control unit is configured to:
acquire information on a lane where at least one of the vehicle and the oncoming vehicle is traveling by a sensor provided in the vehicle; and
determine the estimated speed of the oncoming vehicle based on the information on the lane acquired from the sensor.

13. The control apparatus according to claim 1, wherein:
the vehicle seat includes the actuator for reclining that adjusts the reclining angle of the seat back rearward in the seat front-rear direction; and
the electronic control unit is configured to
when the electronic control unit determines that no road divider is provided on the road where the vehicle is traveling by the automatic driving, control the actuator for reclining such that the reclining angle becomes smaller than a first reclining angle in a case in which the electronic control unit determines that the road divider is provided, or
when the electronic control unit determines that no road divider is provided on the road where the vehicle is traveling, output the warning signal at the reclining angle smaller than the first reclining angle in a case in which the electronic control unit determines that the road divider is provided.

14. The control apparatus according to claim 13, wherein the electronic control unit is configured to set the predetermined angle based on a position in the seat front-rear direction of the seat cushion.

15. The control apparatus according to claim 13, wherein the electronic control unit is configured to set the predetermined angle based on a position of knees of an occupant seated in the seat cushion.

16. The control apparatus according to claim 13, wherein the electronic control unit is configured to set the predetermined angle based on a position of a head of an occupant seated in the seat cushion.

17. The control apparatus according to claim 13 wherein:
the electronic control unit is configured to, when the electronic control unit determines that the road divider is provided, set at least one of the predetermined angle and the predetermined position based on at least one of a traveling speed of the vehicle and an estimated speed of the vehicle;

the vehicle seat includes the actuator for reclining that adjusts the reclining angle of the seat back rearward in the seat front-rear direction;

the electronic control unit is configured to
when the electronic control unit determines that no road divider is provided on the road where the vehicle is traveling by the automatic driving, control the actuator for reclining such that the reclining angle becomes smaller than a first reclining angle in a case in which the electronic control unit determines that the road divider is provided, or when the electronic control unit determines that no road divider is provided on the road where the vehicle is traveling, output the warning signal at the reclining angle smaller than the first reclining angle in a case in which the electronic control unit determines that the road divider is provided; and the electronic control unit is configured to cause the seat back to incline frontward, by operating the actuator for reclining, so as to set the reclining angle to an angle equal to or smaller than the predetermined angle.

18. The control apparatus according to claim 1, wherein:
the vehicle seat includes the actuator for seat sliding that adjusts the position of the vehicle seat in the seat front-rear direction; and the electronic control unit is configured to
when the electronic control unit determines that no road divider is provided on the road where the vehicle is traveling by the automatic driving, control the actuator for seat sliding so as to position the vehicle seat more frontward than in a case in which the electronic control unit determines that the road divider is provided, or when the electronic control unit determines that no road divider is provided on the road where the vehicle is traveling, output a warning signal in a state in which the vehicle seat is positioned more frontward than in the case in which the electronic control unit determines that the road divider is provided.

19. The control apparatus according to claim 1, wherein
the electronic control unit is configured to decelerate the vehicle at least either when the seat back is inclined rearward at an angle more than a predetermined angle or when the vehicle seat is positioned more rearward than the predetermined position.

20. The control apparatus according to claim 1, wherein
the electronic control unit is configured to:
acquire information on the road where the vehicle is traveling by wireless communication; and perform at least one of a control on the actuator and an output of the warning signal, assuming that no road divider is provided when the electronic control unit determines that the road is a road for two-way traffic based on the information on the road acquired by the wireless communication.

21. The control apparatus according to claim 1, wherein:
the vehicle is configured to travel by manual driving or the automatic driving;

the seat back is configured to be inclined rearward by the electronic control unit operating the actuator when driving of the vehicle is switched from the manual driving to the automatic driving; and the vehicle seat is configured to
be moved rearward by the electronic control unit operating the actuator when the driving of the vehicle is switched from the manual driving to the automatic driving, or be moved rearward with the seat back being inclined rearward by the electronic control unit operating the actuator when the driving of the vehicle is switched from the manual driving to the automatic driving.

* * * * *